(12) United States Patent
Harold et al.

(10) Patent No.: US 11,089,731 B2
(45) Date of Patent: Aug. 17, 2021

(54) PLANT TRIMMING DEVICE

(71) Applicant: Top Shelf Trimmers LLC, Thornton, CO (US)

(72) Inventors: Jacob Hawk Harold, Thornton, CO (US); Aleksandr Mikhaylovich Ananin, Bridgeport, CT (US); Irfan Yunas Nadiadi, Superior, CO (US)

( * ) Notice: Subject to any disclaimer, the term of this patent is extended or adjusted under 35 U.S.C. 154(b) by 517 days.

(21) Appl. No.: 15/375,124

(22) Filed: Dec. 11, 2016

(65) Prior Publication Data
US 2017/0164557 A1 Jun. 15, 2017

Related U.S. Application Data

(60) Provisional application No. 62/266,562, filed on Dec. 11, 2015.

(51) Int. Cl.
| | | |
|---|---|---|
| *A01D 46/00* | (2006.01) | |
| *A01G 3/00* | (2006.01) | |
| *A01G 5/00* | (2006.01) | |
| *A01D 46/02* | (2006.01) | |
| *A01G 3/08* | (2006.01) | |

(52) U.S. Cl.
CPC ............ *A01D 46/02* (2013.01); *A01G 3/08* (2013.01)

(58) Field of Classification Search
CPC ........ A01D 46/005; A01D 46/02; A01G 3/00; A01G 5/00; A01G 3/08; A01G 2003/005
USPC .......................................................... 99/537
See application file for complete search history.

(56) References Cited

U.S. PATENT DOCUMENTS

| | | | | |
|---|---|---|---|---|
| 1,336,991 A | * | 4/1920 | Urschel .................. | A23N 15/12 99/636 |
| 1,351,143 A | * | 8/1920 | Vaudreuil .............. | A23N 15/12 99/636 |
| 2,114,730 A | * | 4/1938 | Urschel .................. | A23N 15/12 99/636 |
| 2,292,901 A | * | 8/1942 | Schmitz, Jr. ........... | D21B 1/066 241/30 |
| 2,393,461 A | * | 1/1946 | Finley .................... | A23N 15/12 99/636 |
| 3,010,498 A | * | 11/1961 | Carlson .................. | A23N 15/12 99/636 |
| 3,871,723 A | * | 3/1975 | Pray ...................... | F16C 35/042 384/495 |
| 4,043,036 A | * | 8/1977 | Stevens, Sr. ............ | B26B 19/16 30/43.6 |
| 4,116,161 A | * | 9/1978 | Steube .................. | C23C 14/223 118/418 |
| 4,167,975 A | * | 9/1979 | Fahrenholz ............. | E01H 12/00 171/12 |

(Continued)

*Primary Examiner* — Eric S Stapleton
(74) *Attorney, Agent, or Firm* — Intellent Patents LLC

(57) ABSTRACT

Embodiments are directed to a plant trimmer. The plant trimmer may separate leaves or other peripheral plant matter from a body portion of a plant. In one aspect, an embodiment includes a rotatable basket having a set of ribs separated by openings in a basket sidewall and a cutting assembly having at least one blade. The rotatable basket may be configured to spin in a first direction. The cutting assembly may be configured to spin parallel to the rotatable basket and in a second direction, opposite the first direction. Plant matter extending through one of the openings in the sidewall of the rotatable basket maybe sheared by a cutting face of the blade and a rib of the rotatable basket.

1 Claim, 21 Drawing Sheets

(56) References Cited

U.S. PATENT DOCUMENTS

| | | | | |
|---|---|---|---|---|
| 4,243,181 A * | 1/1981 | Hench | B29B 9/06 | 241/142 |
| 4,392,399 A * | 7/1983 | Wyzgol | B23D 25/12 | 83/106 |
| 4,736,896 A * | 4/1988 | Wagner | B02C 18/302 | 241/82.1 |
| 5,595,349 A * | 1/1997 | Bergstrom | B08B 3/022 | 241/41 |
| 5,746,106 A * | 5/1998 | Hodges | B26D 1/153 | 452/142 |
| 5,875,979 A * | 3/1999 | Walters | B02C 17/007 | 241/299 |
| 6,231,911 B1 * | 5/2001 | Steinback | B26D 3/08 | 426/518 |
| 6,547,170 B2 * | 4/2003 | Byrd | B02C 9/02 | 241/294 |
| 6,655,615 B1 * | 12/2003 | Hartmann | A23N 1/02 | 241/71 |
| 6,659,694 B1 * | 12/2003 | Asbell | B23C 5/04 | 407/40 |
| 6,834,487 B2 * | 12/2004 | Pellenc | A01G 17/026 | 56/330 |
| 7,028,844 B2 * | 4/2006 | Nelson | A01G 5/00 | 209/135 |
| 7,121,071 B2 * | 10/2006 | Berkeley | A01D 43/063 | 56/202 |
| 7,168,643 B2 * | 1/2007 | Mercier | A01D 46/005 | 241/169.1 |
| 8,544,777 B2 * | 10/2013 | Tsai | B29C 48/92 | 241/82.5 |
| 8,757,524 B2 * | 6/2014 | Mosman | A01G 3/00 | 241/30 |
| 9,161,566 B2 * | 10/2015 | Hall | B26D 1/36 | |
| 9,682,488 B2 * | 6/2017 | Beyerlein | A01G 3/00 | |
| 2007/0069056 A1 * | 3/2007 | Shouse | A01G 5/00 | 241/277 |
| 2007/0095216 A1 * | 5/2007 | Zittel | A23N 15/12 | 99/636 |
| 2009/0191928 A1 * | 7/2009 | Snyder, Jr. | A23N 15/02 | 460/134 |
| 2011/0048253 A1 * | 3/2011 | Melandri | A23N 15/025 | 99/638 |
| 2011/0072985 A1 * | 3/2011 | Gaus | B26D 3/26 | 99/537 |
| 2012/0180448 A1 * | 7/2012 | Slater | A01D 43/00 | 56/193 |
| 2012/0279193 A1 * | 11/2012 | Mosman | A01G 3/00 | 56/233 |

\* cited by examiner

PLANT TRIMMING DEVICE

CROSS-REFERENCE TO RELATED APPLICATION

This application is a non-provisional patent application of and claims the benefit to U.S. Provisional Patent Application No. 62/266,562, filed Dec. 11, 2015, and titled "Mechanical Leaf Trimmer with Low-Diameter Perforated Barrel and Cutting Reel Mechanism Driven by a Single Motor," the disclosure of which is hereby incorporated herein by reference in its entirety.

FIELD

The described embodiments relate generally to a plant trimmer. More specifically, the present disclosure is directed to separating plant material using a rotating object.

BACKGROUND

Plant trimmers are often used to trim and separate leaves from harvest plant material. Many traditional plant trimmers use a stationary blade or "bed-knife" to separate plant material. This may limit the purity and consistency of the separated plant material.

SUMMARY

Embodiments of the present invention are directed to plant trimmers used to separate leaves of a plant material.

In a first aspect, the present disclosure includes a plant trimmer. The plant trimmer includes a rotatable basket having a set of ribs that defines at least part of a sidewall of the rotatable basket and defines a plurality of openings in the sidewall. The plant trimmer further includes a cutting assembly extending along a rotation axis parallel to a cylindrical axis of the basket and including a blade configured to rotate about the rotation axis. The rotatable basket is configured to spin in a first direction about the cylindrical axis. The cutting assembly is configured to spin in a second direction, opposite the first direction, such that plant matter extending through one of the openings in the sidewall of the basket is sheared by a cutting face of the blade and a rib of the basket.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

For example, in an embodiment, the blade of the cutting assembly is separated from the basket by a gap. The rotation of the rotatable basket may cause the plant matter to extend across the gap and into the cutting assembly. The sheared plant matter may separate within the gap. The cutting assembly may be positioned vertically below, and laterally offset from, the rotatable basket. Alternatively, the rotatable basket is concentrically positioned within the cutting assembly.

In another embodiment, the blade may be a first blade of a group of blades. The cutting assembly may further include a pair of plates. The group of blades may extend between, and are positioned about a perimeter of, the pair of plates. Additionally or alternatively, the ribs of the rotatable basket may define a first helical pattern and the group of blades may define a second helical pattern having an opposite handedness to the first helical pattern.

In a second aspect, the present disclosure includes a plant trimmer. The plant trimmer includes a case. The plant trimmer further includes a pair of carriages configured to counter rotate with respect to each other. A first carriage of the pair of carriages has a slotted shell and a second carriage of the pair of carriages, positioned lower than the first carriage, has a pattern of helical blades. The plant trimmer further includes a space separating the pair of carriages and extending along a longitudinal direction substantially parallel with an axis of rotation of each of the pair of carriages. The pair of carriages is configured to sever plant matter extending across the space by exerting opposing forces on a sample.

A number of feature refinements and additional features are applicable in the second aspect and contemplated in light of the present disclosure. These feature refinements and additional features may be used individually or in any combination. As such, each of the following features that will be discussed may be, but are not required to be, used with any other feature combination of the second aspect.

For example, in an embodiment, the pair of carriages may be configured to sever the plant matter free from contact with a non-rotating blade. As such, the plant trimmer may not include a bed knife. The plant trimmer may further include a pair of support legs coupled with the case and configured to support the case above an external environment.

According to another embodiment, the plant trimmer further includes a sensing element positioned within the case and configured to measure a characteristic of the pair of carriages. The plant trimmer further includes a processing unit coupled with the sensing element and configured to cause the pair of carriages to rotate according to a parameter based on the measured characteristic. Additionally or alternatively, the characteristic may correspond to a volume of a resin contained within one or both of the pair of carriages. The resin may be expelled from the plant matter during counter rotation of the pair of carriages. The processing unit may be further configured to alter a rotational speed of one or both of the pair of carriages when the volume of the resin exceeds a threshold value.

In a third aspect, the present disclosure includes a plant trimmer. The plant trimmer includes a cylindrical drum having a series of elongated slots formed therein, with a width of at least two adjacent slots being greater than a distance separating the adjacent slots. The plant trimmer further includes a cutting assembly having at least one engagement feature. The plant trimmer further includes a cutting interface defined along a longitudinal dimension of the cylindrical drum and the cutting assembly. The cutting interface is positioned higher than a lowest point of the cylindrical drum. The cylindrical drum and the cutting assembly are configured to exert opposing forces on a material extending across the cutting interface and between an elongated slot of the series of elongated slots and the engagement feature.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combination of the third aspect.

For example, in an embodiment, the plant trimmer may further include a first shield positioned between the cylindrical drum and the cutting assembly and defining a first boundary of the cutting interface. The plant trimmer may further include a second shield positioned between the cylindrical drum and the cutting assembly and defining a second boundary of the cutting interface opposite the first boundary. As such, the opposing forces sever the material at the cutting interface. In some cases, the first and second shields cooperate to maintain a suction force drawing plant material into the cutting interface.

According to another embodiment, the at least one engagement feature is a knife that spans the longitudinal dimension of the cutting assembly. The knife may be configured to rotate about a longitudinal axis of the cutting assembly to move through the cutting interface. Additionally or alternatively, the plant trimmer further includes a brush positioned above the cylindrical drum. The brush may have an array of bristles extending from a central axis and may be configured to rotate about the central axis. A subset of the array of bristles at least partially extends into the elongated slots.

In a further embodiment, the plant trimmer further includes a drive belt coupled with the cylindrical drum and the cutting assembly. The drive belt may be configured to counter rotate the cylindrical drum and the cutting assembly. The cylindrical drum may have a diameter that is greater than a diameter of the cutting assembly such that the cylindrical drum rotates at a rate that is less than a rate of rotation of the cutting assembly. The rotation of the cylindrical drum and the cutting assembly may cause the cylindrical drum and the cutting assembly to exert the opposing shear on the material.

In another embodiment, the at least one engagement feature may be a wire of a group of wires. The group of wires may be positioned concentrically about the cylindrical drum. The cylindrical drum may rotate relative to the group of wires. The group of wires may form a helical pattern. In this regard, the group of wires may be positioned transverse to corresponding one of the elongated slots.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1:
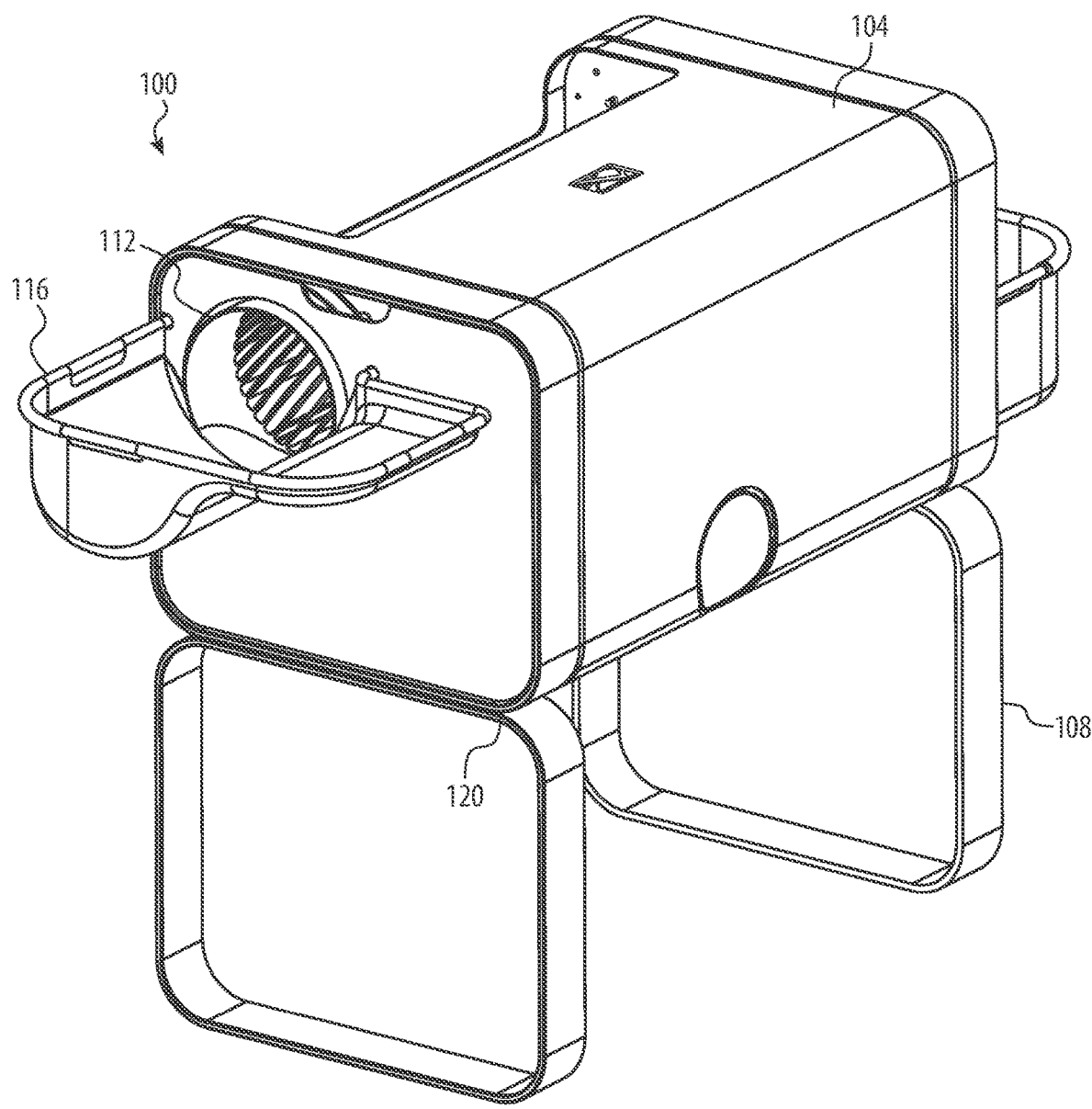
FIG. 1 depicts a sample plant trimmer.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalties of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to a plant trimmer. The plant trimmer may be used to separate or sever selective portions of various organic or inorganic compounds or plant materials. In a particular embodiment, the plant trimmer may be used to separate leaves from a harvest plant material, such as hops, rosemary, oregano, basil, mint, lavender, coriander, mixed flowers, and/or other plant materials, including ingestible or otherwise consumable plant materials. The remaining portion of the harvested plant material may be a flowering or body portion of the plant, a stem, a branch, a stalk, a root, or any other base material from which leaves may be separated. The separated leaves and/or the remaining portion may be used in a variety of applications, including cooking, direct consumption, mulch, compost, pharmaceutical applications, potpourri, animal feed, or other ingestible or non-ingestible uses.

The plant trimmer separates leaves of the plant material by severing the leaf (or a stem or other member connecting a leaf to a remaining portion of the plant material) between two components. In some cases, each component may rotate. In a sample embodiment, a first rotating component, such as a drum, may receive therein a plant material that contains leaves and a flowering portion. Rotation of the first rotating component in a first direction may cause a leaf to extend through a permeable sidewall of the first rotating component and toward the second rotating component. A second rotating component, such as a rotating blade, knife, or other engagement feature may be positioned substantially parallel with, and offset from, the first rotating component. Rotation of the second rotating component in a second direction, opposite the first direction, may cause the first and second rotating components to exert opposing forces on the leaf. This may cause the leaves to be severed by the first and second rotating components. The rotation of the first and second rotating components may continue until a substantial portion of the leaves are separated from the plant material. In some cases, the first and second rotating components may rotate in the same direction at different speeds. In some cases, the second component may be stationary, as described herein.

In some embodiments, the plant trimmer severs the leaf without the use of a non-rotating blade, such as a bed knife. For example, the counter rotation of the first and second rotating components (where the components rotate in opposing directions) allows the plant trimmer to sever the leaf within a gap or space between the first and second rotating components, without direct metal-to-metal contact between the rotating components or between a rotating component and a stationary blade, such as a bed knife, or other immobile cutting instrument. More particularly, the opposing forces exerted on the leaf by the first and second rotating components shear, tear, rip, or otherwise sever the leaf (or leaf stem) without requiring metal-to-metal contact between cutting components. This arrangement may reduce contamination of the trimmed plant material (e.g., the leaves) and/or the remaining plant material (e.g., the flowering body or stem). For example, the lack of a bed knife in contact with a rotating component (such as a cutting reel) may reduce the occurrence of metal particulates released into the plant material.

In one embodiment, the first rotating component may be defined by a rotatable basket, carriage, or drum, and the second rotating component may be defined by a cutting assembly, blade, carriage, or cutting reel. The first rotating component may have a permeable sidewall such that a portion of the plant material may extend through the sidewall. For example, the sidewall of the first rotating component may be defined by a set of ribs separated by interposed openings. The second rotating component may also be permeable such that plant material may extend into the second rotating component. For example, the second rotating component may be defined by one or more blades positioned circumferentially about the second rotating component. Thus, leaves of plant material inside the first rotating component may extend through the permeable sidewall of the first rotating component and between the blades of the second rotating component.

During counter rotation of the first and second rotating elements, a leaf may be momentarily coupled or engaged with both of the first and second rotating elements. For example, proximal to a flowering portion, the leaf may be engaged with a rib of the first rotating component. Correspondingly, distal to the flowering portion, the leaf may be engaged with a blade of the second rotating component. In this manner, the engagement of the leaf with the first and second rotating components pulls the leaf in opposing direction during the counter rotation.

It will be appreciated that the leaf may be severed without movement or rotation of the second rotating component, or with the components rotating in the same direction at different speeds. Indeed, the cutting action described herein may be produced with various combinations of rotational directions, speeds, etc., so long as there is a speed differential between the relevant components. For example, the second component may be a group of helically arranged wires wrapped around or positioned proximate to the first rotating component. The second component may also be a group of straight wires positioned proximate the first rotating component. Rotation of the first rotating component may cause the plant material to extend through openings in the first rotating component, allowing wire of the second component to engage the plant material, thereby causing it to be severed by the two components.

To facilitate the foregoing, the permeable features of the first and second rotating components may be arranged in any appropriate manner. In a particular embodiment, the ribs of the first rotating component may be arranged in a spiral or helical pattern. The spiral or helical pattern of the ribs may help define a cutting angle with respect to the second rotating component. Also, the helical pattern may drive the plant material through the first rotatable component from one end of the rotatable basket 136 to the opposite end, where the plant material may be collected. Accordingly, plant material may be processed in a continuous fashion, with a constant motion of the plant material from an inlet to an outlet of the plant trimmer.

The blades of the second rotating component may also be arranged in a spiral or helical pattern. The helical pattern of the ribs may have a handedness that is opposite of a handedness of the blades (e.g., each helix spirals in an opposing direction). This may allow the first and second rotating components to exert opposing forces on the leaf during the counter rotation. The helical patterns of the ribs and the blades may have helical angles (e.g., the angle between a given helix and an axial line), which may be calibrated or selected to achieve a desired cutting action or tolerance. In other embodiments, one or both of the ribs and the blades may be substantially parallel with a rotational axis of the first and/or second rotating components.

The first and second rotating components may be arranged within the plant trimmer to reduce "wall creep" and resin accumulation during leaf trimming (e.g., during rotation of the first and second rotating components). Wall creep occurs when plant material adheres to walls of the rotating components such as the first rotating component or drum. This may cause the excess material to block or otherwise clog a cutting interface between, for example, the first and second rotating components, thereby deteriorating cutting performance of the plant trimmer. Wall creep may also cause plant material to be positioned away from a cutting region of the plant trimmer, such as when the plant material creeps up the wall of the drum beyond a cutting region or interface. Resin accumulation may also cause deterioration of cutting performance by jamming or otherwise interfering with the rotating components of the plant trimmer.

In this regard, the second rotating component may be positioned vertically below, and offset from, the first rotating component. A cutting interface may be defined along a longitudinal dimension of the first and second rotating components and positioned higher than a lowest point of the second rotating component. Leaves may extend across, and be separated within, the cutting interface during the rotation of the rotating components.

The rotational speed of one or both of the rotating components may be adjusted to reduce resin accumulation, or otherwise optimize or customize the performance of the plant trimmer. In one embodiment, a sensing element positioned within the plant trimmer may measure a value of resin accumulation within one or both of the rotating components during counter rotation. A processing unit coupled with the sensing element may alter the speed of one or both of the rotating components (e.g., by altering the speed of one or more motors) based on a quantity of resin measured using the sensing element. In other cases, the sensing element may be employed to monitor and/or alter any other operational parameter of the plant trimmer.

Movement of plant material through the plant trimmer may also be assisted by a vacuum or other component configured to exert a suction force on plant material received in the plant trimmer. As one example, one or both of the rotating elements may be partially contained within a pressurized chamber. The pressurized chamber (e.g., a vacuum or suction chamber) may be at least partially defined by one or more shields, manifolds, or the like surrounding the rotating components. This may cause plant material to move towards, and through, the cutting interface defined between the first and second rotating components. The pressurized chamber may also be configured such that leaves or other plant material separated at the cutting interface move through the second rotating component and to an outlet of the plant trimmer.

Additionally or alternatively, movement of the plant material may be facilitated by a brush or other mechanical component that advances the plant material through the plant trimmer. For example, the plant trimmer may include a brush that disengages stray plant material from a portion of the rotating components. Removing such stray materials may improve cutting efficiencies and tolerances, as described herein.

It will be appreciated that the first and second rotating components may be positioned within the plant trimmer in a variety of manners. In one embodiment, as described above, the second rotating component may be positioned vertically below, and offset from, the first rotating component. In another embodiment, the first rotating component may be positioned concentrically within the second rotating component. This or other embodiments of rotating components may alter a cutting characteristic of the processed plant material. For example, the concentrically arranged rotating components may alter a cutting tolerance. In other embodiments, other arrangements of the rotating components are contemplated.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Example embodiments, as described below, may be used to provide a method, a system and/or a device for a mechanical plant trimmer utilizing a low-diameter perforated barrel and a cutting reel mechanism driven by a single motor.

FIG. 1 depicts a plant trimmer 100, such as the plant trimmer generally discussed above and described in greater detail below. The plant trimmer 100 may be configured to separate or sever leaves of a plant material between two components, at least one of which may rotate. The leaves may extend through perforations, openings, and/or other permeable features of the components, thus extending into or across a cutting interface and allowing the leaves to be cut. In a particular embodiment, the components may counter rotate with respect to one another such that leaves sever at a point between the rotating components. Alternatively, one component may rotate, or the components may rotate in the same direction at different speeds.

As depicted in FIG. 1, the plant trimmer 100 may include an external shell 104 and a pair of support legs 108. The external shell 104 may be an external covering or casing that encompasses the rotating components of the plant trimmer 100. The external shell 104 may define an opening 112 that is coupled with a feed sleeve 116. Plant material may be received at the opening 112 via the feed sleeve 116.

The support legs 108 may support the external shell 104 above an external environment or surface. In one embodiment, the support legs 108 may position the external shell 104 to a working height of a user. The support legs 108 may be rod-like and may extend telescopically. Other shapes (e.g., rods, triangles, etc.) and features (e.g., with telescopic extensions) may be used to support the mechanical plant trimmer 100 and are within the scope of the exemplary embodiments described herein.

Figure 2:
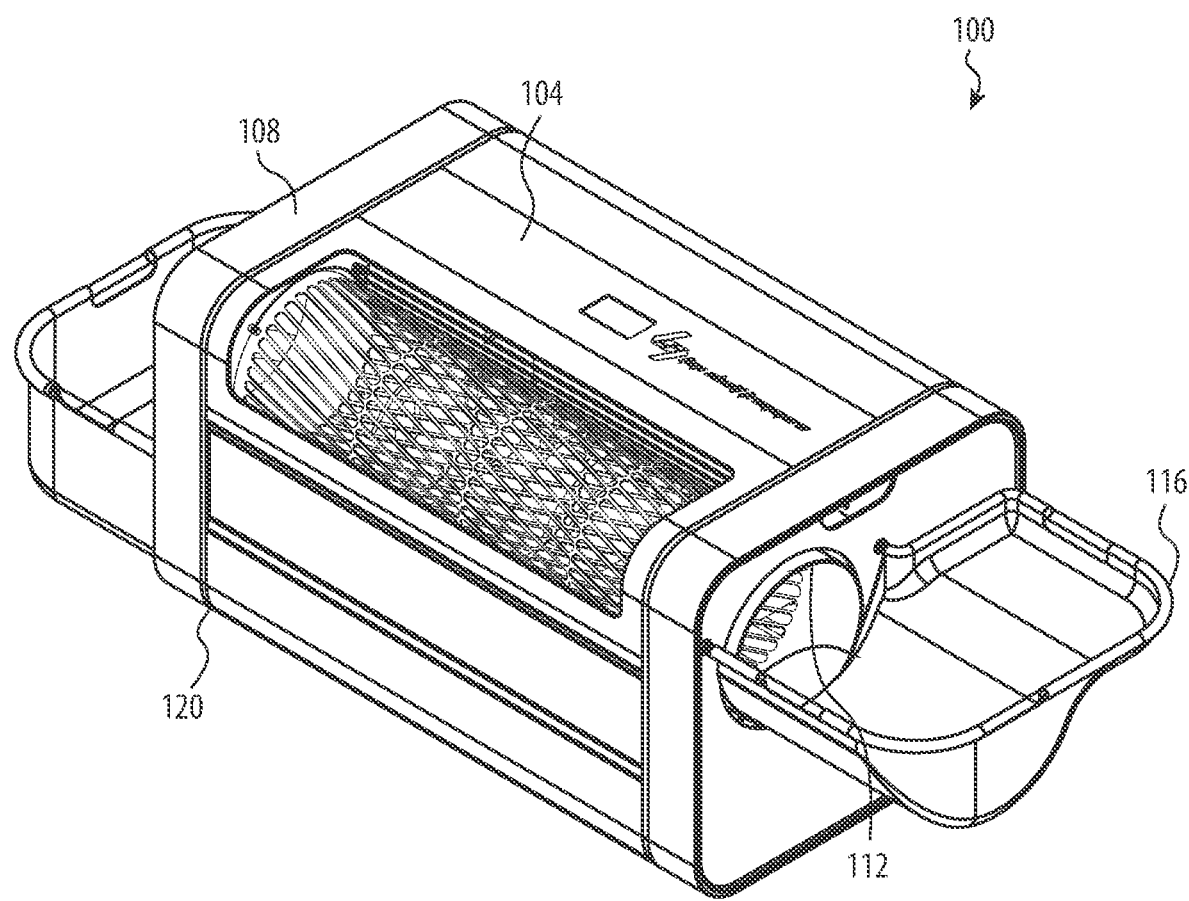
FIG. 2 depicts the sample plant trimmer of FIG. 1 having folded support legs.

As depicted in FIG. 2, the support legs 108 may be folded up for portability and transport or to accommodate different positioning of the plant trimmer 100 during operation. The support legs 108 may be coupled to the external shell 104 at a hinge 120. This may allow the support legs 108 to fold towards the external shell 104 when the support legs 108 are not in use.

Figure 3:
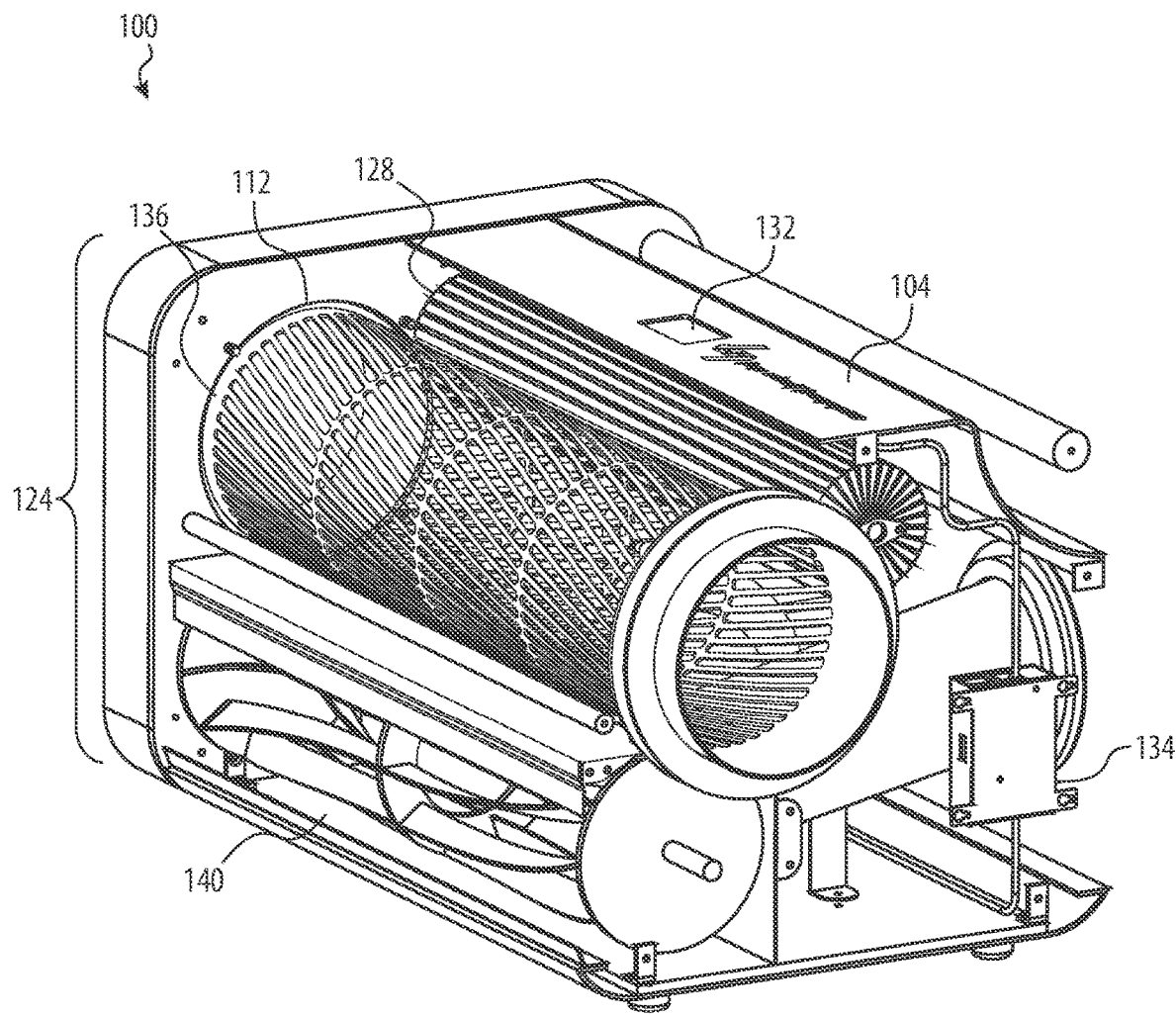
FIG. 3 depicts the sample plant trimmer of FIG. 1 without an exterior shell.

FIG. 3 depicts the plant trimmer 100 having the exterior shell 104 partially removed to show the interior components of the plant trimmer 100 of FIG. 1. As shown, the plant trimmer 100 includes a trimming mechanism 124, a brush 128, and a display 132, each of which may be coupled with the exterior shell 104 or any suitable structural component of the plant trimmer 100.

The trimming assembly 124 may be configured to sever or separate plant material received at the opening 112. As described in greater detail below with respect to FIGS. 4A-5, the trimming assembly 124 may include a rotatable basket 136 (e.g., a carriage, cylindrical drum, or the like) and a cutting assembly 140 (e.g., a carriage, cutting reel, or the like). The rotatable basket 136 and the cutting assembly 140 may be configured to counter rotate with respect to one another. The counter rotation of the rotatable basket 136 and the cutting assembly 140 may separate plant material within the trimming mechanism 124, as described herein.

The brush 128 may be positioned within the exterior shell 104 adjacent and in contact with the rotatable basket 136. The brush 128 may include an array of bristles extending from a central axis of the brush 128. The bristles may engage with the rotatable basket 136 (e.g., by extending into and/or through the openings in the rotatable basket 136) to remove or otherwise clear plant material from the rotatable basket 136.

The display 132 may be positioned on a surface of the exterior shell 104, such as a top surface. The display 132 may be configured to display indicia corresponding to a status or characteristic of the plant trimmer 100. For example, the display 132 may display an indium corresponding to a rotational speed or other operational characteristic of the plant trimmer 100. The display 132 may also accept inputs, such as values of operational parameters (e.g., drum speed, cutting reel speed, vacuum speed/pressure, etc.), selections of affordances (e.g., buttons), and the like, and communicate with a processing unit 134 (discussed below) to cause the processing unit 134 to operate the plant trimmer 100 in accordance with the received inputs.

The plant trimmer 100 may also include a processing unit 134 positioned within the exterior shell 104. The processing unit 134 may be used to control a function of the plant trimmer 100. For example, the processing unit 134 may be used to alter a rotational speed of one or both of the rotatable basket 136 and/or the cutting assembly 140. In a sample use case, the processing unit 134 may receive input from a user (via the display 132), which the processing unit 134 may use to control a motor coupled with the rotatable basket 136 and/or the cutting assembly 140. In this regard, the display 132 may be coupled with the processing unit 134 and configured to display indicia corresponding to a rotational speed or other operational characteristic of the plant trimmer 100 based on a signal from the processing unit 134.

The processing unit 134 may be coupled with one or more sensors that detect various electrical and/or mechanical variables of the plant trimmer 104. In a particular example, the sensors of the plant trimmer 100 may include a resin sensor that is configured to detect resin accumulation within the plant trimmer 100. As such, the plant trimmer 100 may be controlled based on the detected resin. For example, a rotational speed of one or both of the rotatable basket 136 and/or the cutting assembly 140 (or a vacuum motor speed) may be altered based on the detection of resin satisfying a threshold. Other sensors may be used and are within the scope of the embodiments described herein. As such, various other electrical or mechanical variables that facilitate operation, maintenance, cut quality, failure detection, calibration, spacing, and/or positioning of any internal components, deployment of the support legs 108, speed of the motor, is within the scope of the embodiments described herein.

Figure 4A:
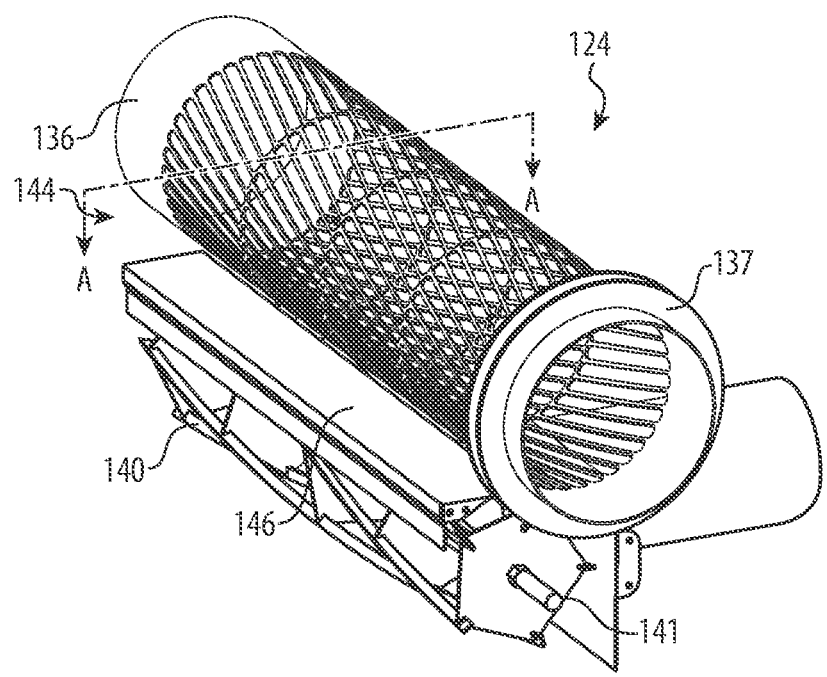
FIG. 4A depicts a first view of the cutting mechanism of FIG. 3.
Figure 4B:
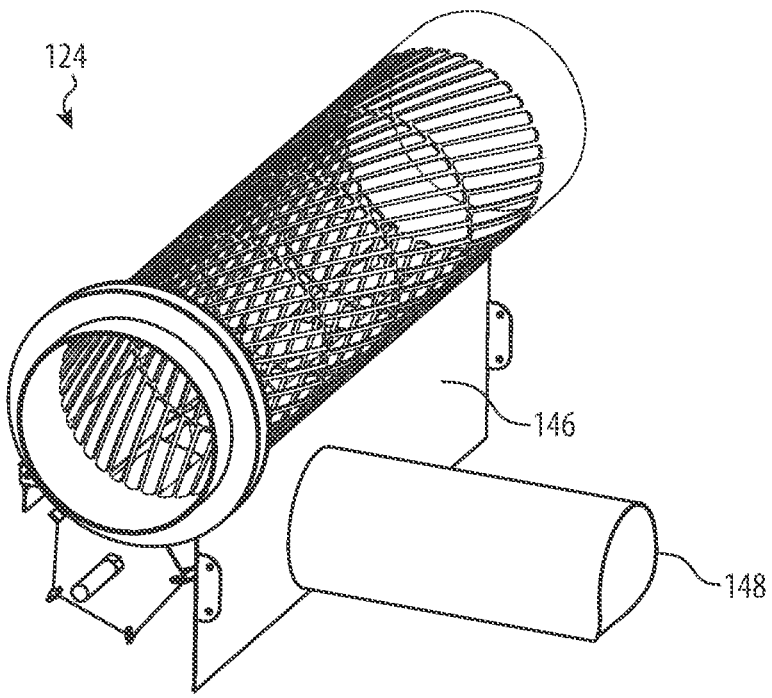
FIG. 4B depicts a second view of the cutting mechanism of FIG. 3.

FIGS. 4A-4B depict various views of the trimming mechanism 124 of FIG. 3. The trimming mechanism 124 may include the rotatable basket 136 and the cutting assembly 140. In one embodiment, the rotatable basket 136 includes a set of ribs defining a sidewall of the rotatable basket 136. In other cases, the ribs may be a slotted shell or other permeable feature of the rotatable basket 136. The ribs may be separated by openings in the sidewall through which leaves may be pulled. The ribs may define a helical pattern. Alternatively, the ribs may be straight such the openings are substantially parallel with a longitudinal axis of the rotatable basket 136.

The cutting assembly 140 may include a pair of plates (or other support structures) and a plurality of blades or other engagement feature spanning a length of the cutting assembly 140 between the pair of plates. The plurality of blades may extend between, and be positioned about a perimeter of, the pair of plates or other support structures. The blades of the cutting assembly 140 may spiral in a direction opposite to that of the openings. Stated differently, the helical pattern of ribs may have a handedness that is opposite of a handedness of the helical pattern of blades. As such, both the rotatable basket 136 and the cutting assembly 140 may contribute a corresponding or equivalent force to the separation of the plant material at the trimming mechanism 124.

As explained in greater detail below with respect to FIGS. 5 and 6, a cutting interface 144 may be defined between the rotatable basket 136 and the cutting assembly 140. Plant material may extend across the cutting interface 144 and be severed at or within the cutting interface 144 during rotation of the rotatable basket 136 and/or the cutting assembly 140. As shown in FIGS. 4A and 4B, the cutting interface 144 may extend along a longitudinal dimension of the rotatable basket 136 and the cutting assembly 140.

The trimming assembly 124 may also include shields 146. The shields 146 may be positioned between the rotatable basket 136 and the cutting assembly 140 and define one or more boundaries of the cutting interface 144. The shields 146 may be used to define a substantially enclosed environment around the cutting assembly 140 to help maintain a low-pressure or suction area around the cutting assembly 140. For example, a suction force may be induced within the portion of the plant trimmer 100 bounded by the shields 146 (e.g., a portion that contains the cutting assembly 140). This may help draw leaf material through the openings in the rotatable basket 136 and may cause leaf material severed at the cutting interface 144 to travel away from the trimming assembly 124 and subsequently exit the plant trimmer 100 through an outlet 148 (or otherwise collect in a collection basin or trap).

As explained in greater detail below with respect to FIGS. 8A-9B, the trimming mechanism 124 may be configured such that a single motor rotates both the rotatable basket 136 and the cutting assembly 140. For example, the rotatable basket 136 may include a barrel pulley 137 and the cutting assembly 140 may include a reel pulley 141. The pulleys 137, 141 may be configured to receive a common drive belt. This may allow the pulleys 137, 141 to rotate in unison. The ratio of the diameter of the pulley 137 and the diameter of the pulley 141 may be greater than 1. Thus, the rotatable basket 136 may rotate at a rate that is slower than a rate of the rotation of the cutting assembly 140. As such, blades of the cutting assembly 140 may perform a higher amount of cuts (at a greater angular speed and higher torque) during a single rotation or cycle of the rotatable basket 136. This may allow the plant trimmer 100 to shear more leaves in a given period of time. It will be appreciated that the pulleys 137, 141 may be resized (e.g., by replacing the pulleys with different-sized pulleys) to achieve a different relative rotational speed. Also, the common drive belt may include a crossover or otherwise be routed such that the cutting assembly 140 and the rotatable basket 136 rotate in the same direction at different speeds.

Figure 5:
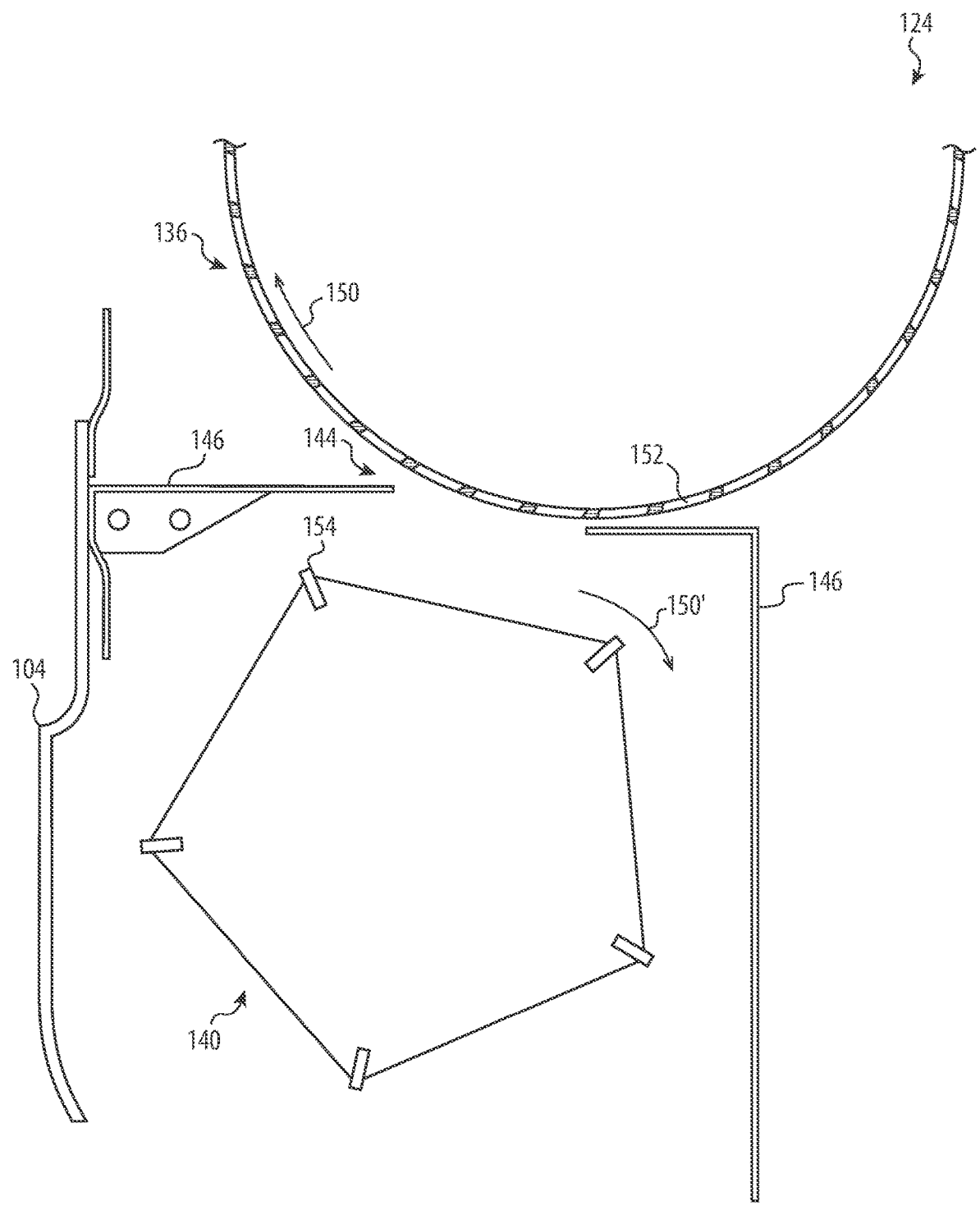
FIG. 5 depicts a cross-sectional view of the cutting mechanism of FIG. 4A, taken along line A-A of FIG. 4A.

FIG. 5 is a cross-sectional view of the trimming mechanism 124 of FIG. 4, taken along line A-A of FIG. 4A. As illustrated, the trimming mechanism 124 includes the rotatable basket 136, the cutting assembly 140, and the shields 146, each of which cooperate to define the cutting interface 144.

In some embodiments, the rotatable basket 136 and the cutting assembly 140 rotate in opposite directions. For example, a common drive belt may rotate each of the rotatable basket 136 and the cutting assembly 140 in opposing directions 150, 150', respectively. At the cutting interface 144, an opening 152 of the rotatable basket 136 moves past a blade 154 of the cutting assembly 140. The opening 152 may be angularly offset from a rotational axis of the rotatable basket 136. Similarly, the blade 154 may be angularly offset from a rotational axis of the cutting assembly 140. The angular offsets of the openings 152 and the blades 154 may be distinct from one another.

The diameter of the rotatable basket 136 may have a diameter that is larger than a diameter of the cutting assembly 140. For example, the cutting interface 144 may be defined along a longitudinal dimension of the rotatable basket 136 and the cutting assembly 140 and be positioned higher than a lowest point on the cutting assembly 140. For example, the cutting assembly 140 may be positioned adjacent a portion of the rotatable basket 136 where plant material naturally accumulates during rotation of the rotatable basket 136. In particular, when the rotatable basket 136 is rotated with plant material therein, the plant material may naturally accumulate at a point that is higher than the lowest point of the cutting assembly 140.

Moreover, cutting leaf material away and upwards from a lowest point of the rotatable basket 136 reduces wall creep by preventing plant material from sliding down and collecting at the bottom of the rotatable basket 136. Additionally, such positioning at the cutting interface 144 may position the plant material in an optimal position along the cutting interface 144 for shearing or cutting by the blade 154.

Figure 6A:
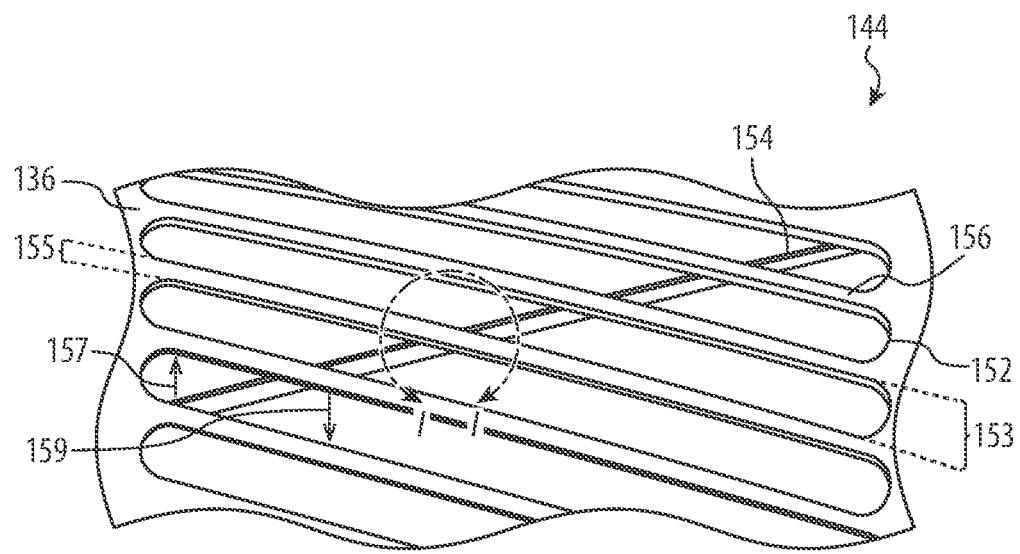
FIG. 6A depicts a top view of the cutting interface of FIG. 4A.

FIG. 6A depicts a top view of the cutting interface 144. For example, FIG. 6A depicts a portion of the rotatable basket 136 and a blade 154 of the cutting assembly 140 (FIG. 5) that is positioned adjacent the rotatable basket 136. The cutting interface 144 is defined along the rotatable basket 136 (FIG. 5) and the cutting assembly 140 (FIG. 5) at an opening 152 of the rotatable basket 136 that may be in close proximity to the blade 154. As such, at the cutting interface 144, leaves may be sheared by the blade 154 and subsequently removed from the plant trimmer 100.

As described above, the rotatable basket 136 may include one or more openings 152. A width 153 of the opening 152 may be greater than a width 155 of a rib 156 positioned between the openings 152. This may reduce the amount of material required to construct the rotatable basket 136. Additionally or alternatively, the material requirements may be further reduced by reducing a thickness of the rotatable basket 136. The opening 152 may have a width 153 ranging from about 0.25 inches to about 1.0 inch, or from about 0.5 inches to about 0.75 inches. The rib 156 may have a width 155 ranging from about 0.1 inches to about 0.75 inches, or from about 0.2 inches to about 0.5 inches. Other widths for the rib and opening are also contemplated, and may be selected based on the particular type and/or size of the plant matter to be trimmed by the trimmer 100.

Figure 6B:
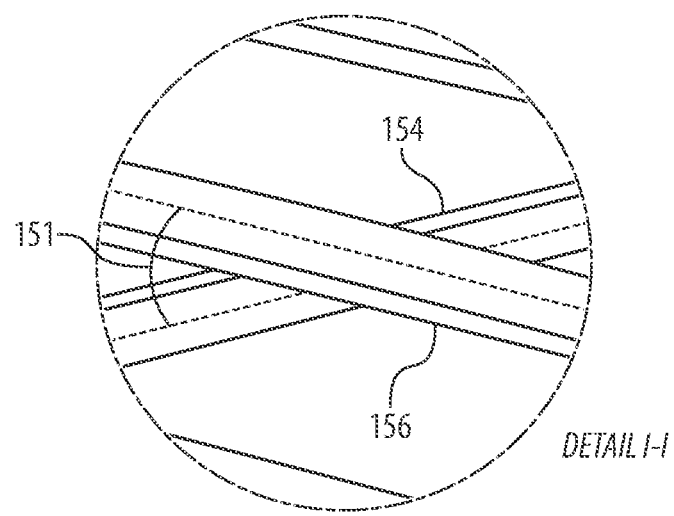
FIG. 6B depicts an enlarged view of the cutting interface of FIG. 6A.

FIG. 6B depicts detail 1-1 of FIG. 6A of the cutting interface 144. As shown in the non-limiting example of FIG. 6B, the blades 154 of the cutting assembly 140 (FIG. 5) and the ribs 156 of the rotatable basket 136 may be oriented to form a particular angle 151 therebetween. The angle 151 may be selected to produce a suitable cutting or shearing effect between the blades 154 and the ribs 156 when the rotatable basket 136 and/or the cutting assembly 140 are rotated. For example, and with reference to FIG. 6A, arrows 157 and 159 show an example of the relative motion of the rotatable basket 136 or the cutting assembly 140 during a cutting or trimming operation. As the ribs 156 of the rotatable basket 136 and the blade 154 of the cutting assembly 140 move along these directions, a leaf or other portion of a plant may be trapped between a rib 156 and a blade 154 and be cut or severed from the remaining portion of the plant, as described in greater detail herein. The angle 151, shown in FIG. 6B, may be any suitable angle. For example, the angle may be in the range of about 10° to about 80°, or from about 30° to about 60°, or any other suitable angle. In some cases, the angle 151 is an acute angle. In cases where the blades 154 and the ribs 156 are aligned parallel to an axis of rotation (e.g., they are straight, rather than helical), the angle 151 may be 0° (e.g., the blades 154 and the ribs 156 are parallel to one another).

Figure 7A:
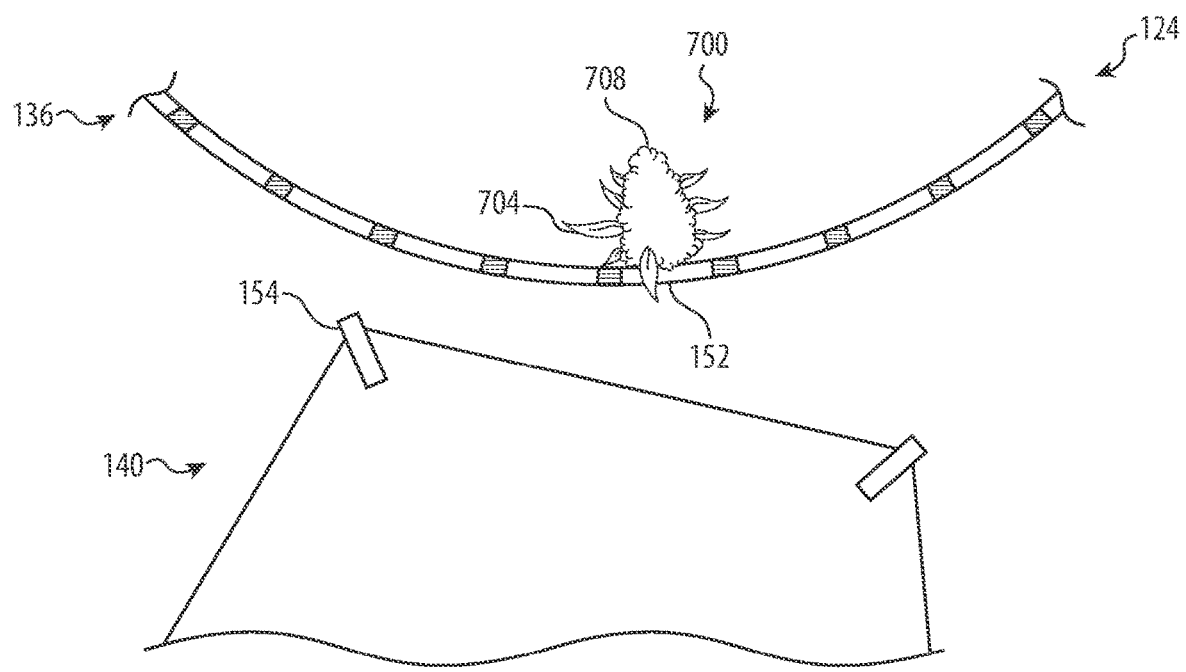
FIG. 7A depicts a cross-sectional view of the cutting mechanism of FIG. 4A in a first configuration, taken along line A-A of FIG. 4A.
Figure 7B:
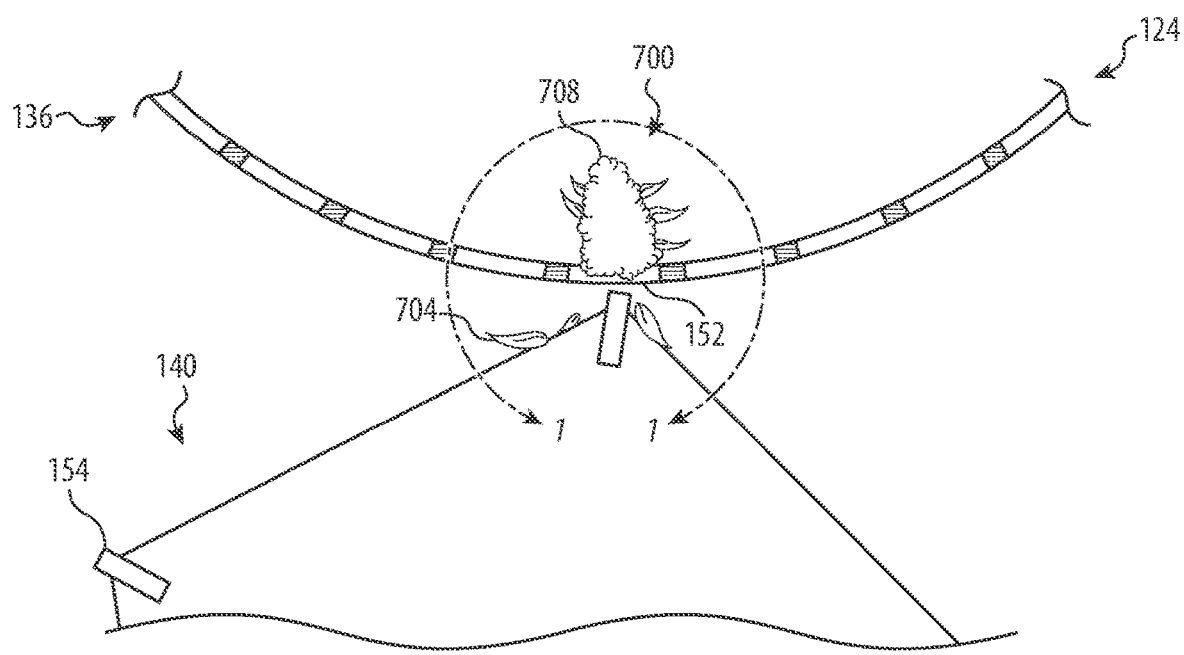
FIG. 7B depicts a cross-sectional view of the cutting mechanism of FIG. 4A in a second configuration, taken along line A-A of FIG. 4A.
Figure 7C:
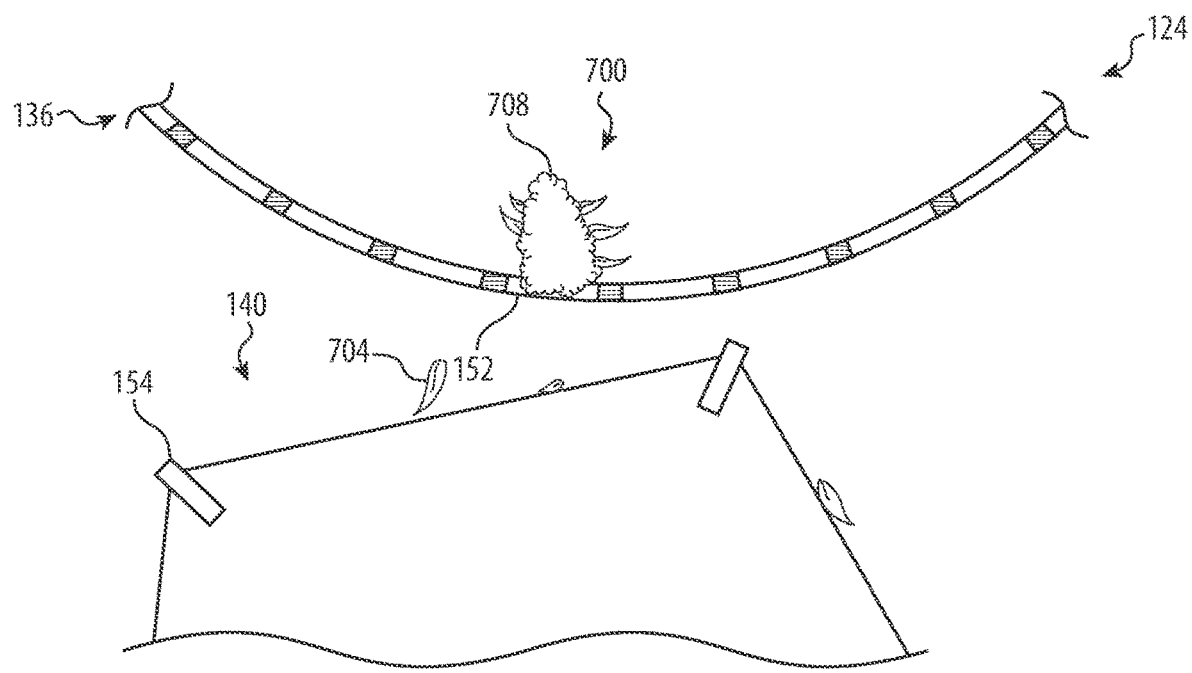
FIG. 7C depicts a cross-sectional view of the cutting mechanism of FIG. 4A in a third configuration, taken along line A-A of FIG. 4A.

FIGS. 7A-7C illustrate cross sectional views of the trimming mechanism 124 of FIG. 4A in various configurations. For example, FIGS. 7A-7C depict the trimming mechanism 124 in various configurations or states of separating a leaf from a flowering portion of plant material received by the plant trimmer 100.

As shown in FIG. 7A, the rotatable basket 136 may receive a plant material 700. The plant material 700 may include leaves 704 and flowering portion 708. Some or all of the leaves 704 may extend through openings 152.

The rotatable basket 136 and the cutting assembly 140 may be configured to counter rotate. As shown in FIG. 7B, the blade 154 may engage a portion of the leaves 704 extending through the opening 152 (and into or across the cutting interface 144). This may cause the leaves 704 to be separated from flowing portion 708 at the cutting interface 144 due to the action of the rotatable basket 136 and the cutting assembly 140.

As shown in FIG. 7C, the plant material 700 (containing the flowering portion 708) may remain in the rotatable basket 136. The separated leaves 704 may be removed by the cutting assembly 140.

Figure 7D:
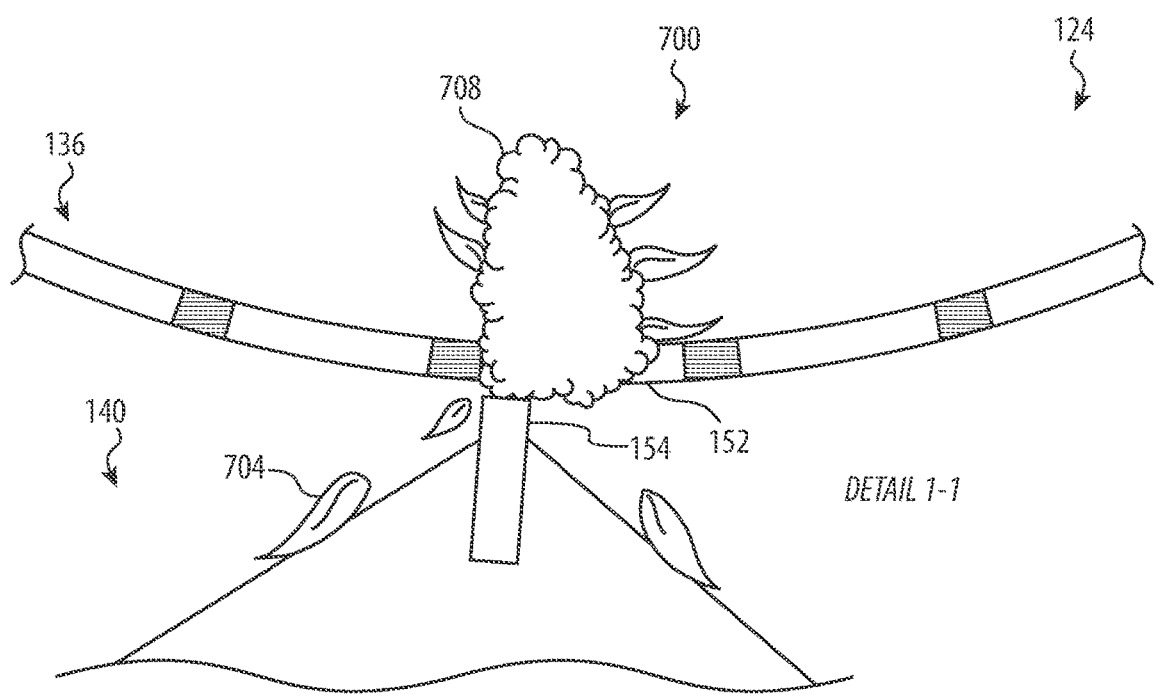
FIG. 7D depicts an enlarged view of the cutting mechanism of FIG. 7B, taken at detail 1-1 of FIG. 7B.

FIG. 7D depicts detail 1-1 of FIG. 7B of the trimming mechanism 124. As shown in the non-limiting example of FIG. 7D, the trimming mechanism 124 is shown in a state in which the blade 154 is cutting, tearing, shearing, or otherwise separating the leaves 704 that extend through the opening 152 from remaining portion of the plant matter. The rotatable basket 136 and the cutting assembly 140 may exert opposing forces (or forces in opposing directions) on the leaves 704. This may cause the leaves 704 to tear at a location between the rotatable basket 136 and the cutting assembly 140. As noted above, in some cases, the ribs 156 of the rotatable basket 136 and the blades 154 of the cutting assembly 140 may not contact one another. Accordingly, the rotatable basket 136 and the cutting assembly 140 may cause the leaves to be cut by a pulling or tearing action, without requiring the ribs 156 and the blades 154 to scrape against each other like the blades of a scissor.

Figure 7E:
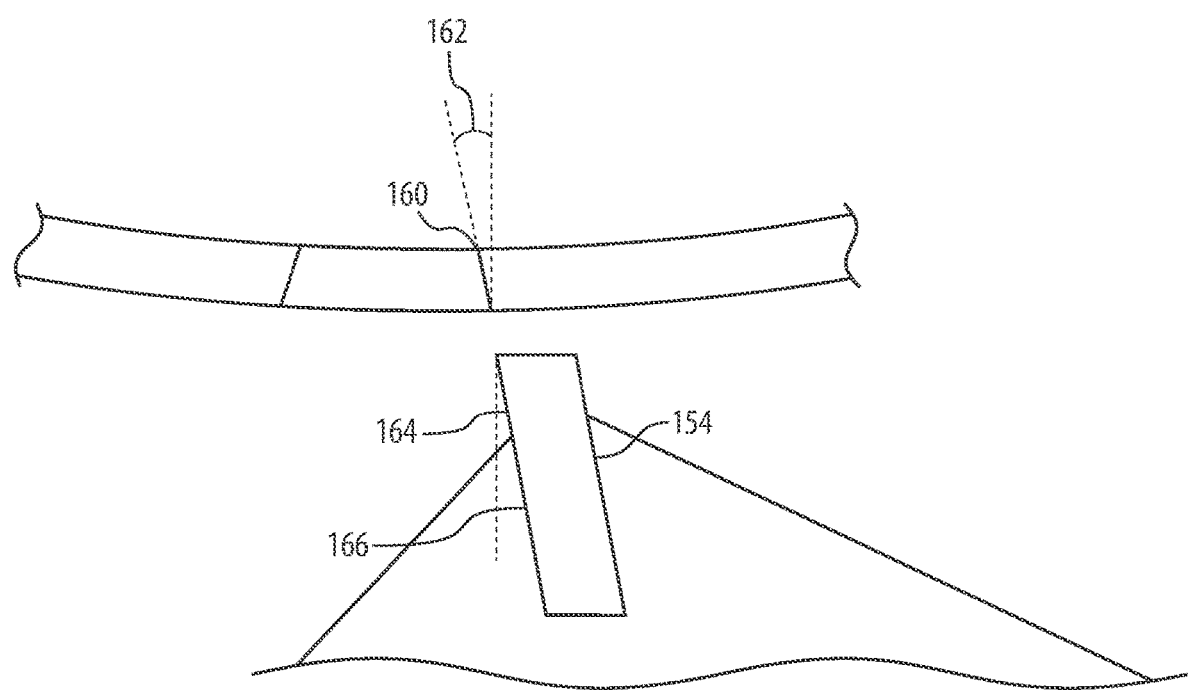
FIG. 7E depicts another enlarged view of the cutting mechanism of FIG. 7B, taken at detail 1-1 of FIG. 7B.

FIG. 7E depicts a portion of detail 1-1 of FIG. 7B without the plant material 700, illustrating example angles of the ribs 156 and the blades 154. In particular, the ribs 156 may define a cutting face 160 having an angle 162 (with respect to a radius of the rotatable basket 136). Similarly, the ribs 156 may define a cutting face 164 having an angle 166 (with respect to a radius of the cutting assembly 140). The angles 162, 166 may be any suitable angles to produce a desired cutting result. In some cases, the angles 162, 166 are such that the cutting faces 160, 164 face away from each other (as shown in FIG. 7E), which may increase the ability of the cutting faces 160, 164 to grab onto the plant material (e.g., a leaf) and pull the leaf apart (as compared to the cutting faces 160, 164 facing each other, for example). The angles 162, 166 may be any suitable angle. For example, the angles 162, 166 may range from about 0° (e.g., parallel to a radius of the rotatable basket 136 or cutting assembly 140) to about 45°, or from about 10° to about 30°. In other cases, the angles 162, 164 may range from about 0° to about −45°, or from about −10° to about −30°, such that the cutting faces 160, 164 face toward one another. The angles 162, 166 may be the same as one another, or different from one another. For example, the angle 162 may be about 30°, while the angle 166 may be about 0°.

Figure 8A:
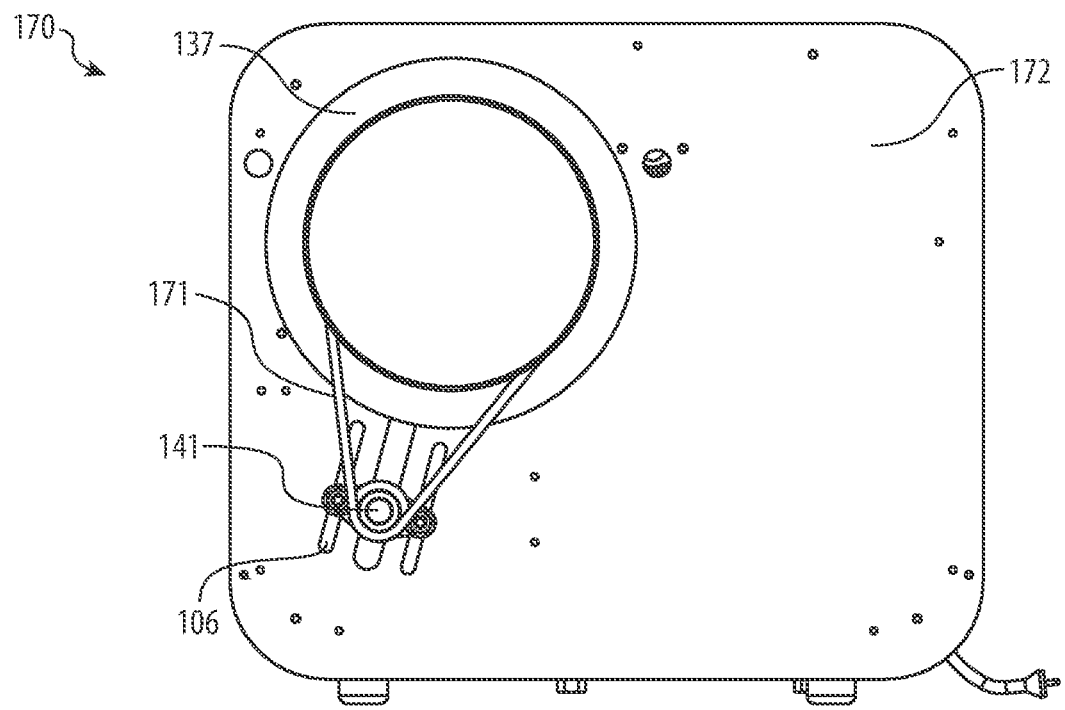
FIG. 8A depicts a reel-barrel drive mechanism of the sample plant trimmer of FIG. 1.

FIG. 8A depicts a first side view of the plant trimmer 100 of FIG. 1, showing a reel-barrel drive mechanism 170. The reel-barrel drive mechanism 170 includes the pulley 141 (positioned on an end of the cutting assembly 140), the pulley 137 (positioned on an end of the rotatable basket 136), and a belt 171 joining the two pulleys 137, 141. As shown in FIG. 8A, the rotatable basket 136 and the cutting assembly 140 may extend through a portion of a mounting plate 172. The mounting plate 172 may be positioned within the exterior shell 104 described with respect to FIG. 1. The mounting plate 172 may include one or more mounting slits 106. The pulley 141 may be slideably engaged with the mounting slits 106. The pulley 141 may be positioned within different ones of the mounting slits 106 to adjust a gap or space between the rotatable basket 136 and the cutting assembly 140, thereby defining a dimension of the cutting interface 144.

Figure 8B:
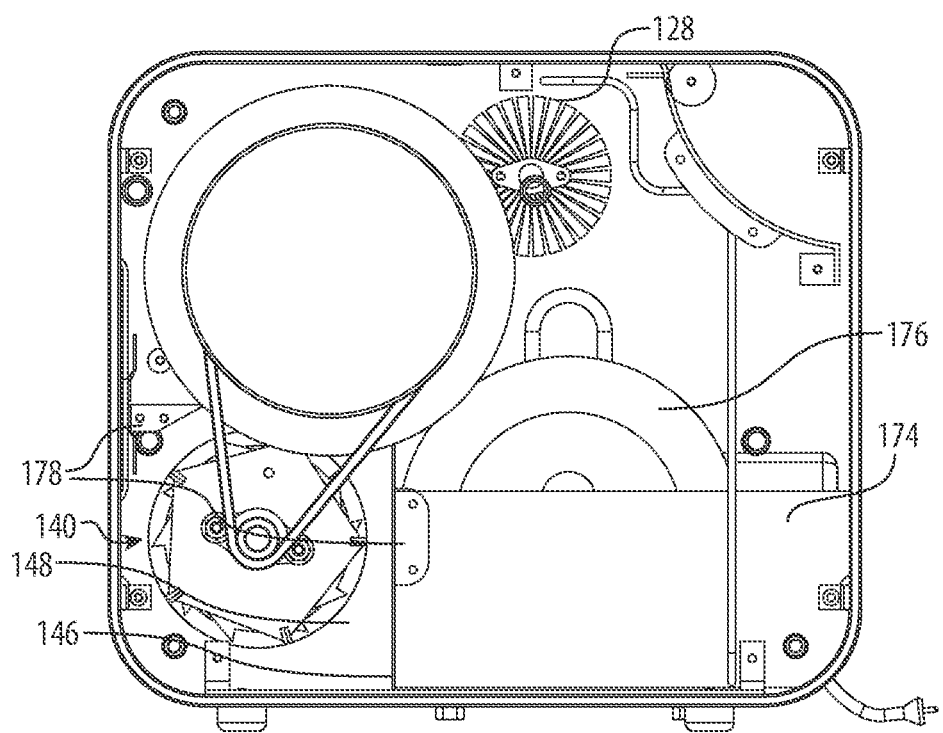
FIG. 8B depicts a reel-barrel drive mechanism of the sample plant trimmer of FIG. 1 without a mounting plate.

FIG. 8B depicts the side view of the plant trimmer 100 show in FIG. 8A without the mounting plate 172. As illustrated, the shields 146 are shown surrounding the cutting assembly 140. This may create a cavity 148 surrounding the cutting assembly 140 to which a vacuum may be applied. The cavity 148 may be connected to a tube 174 through which separated leaf or plant material may travel to reach a receptacle (e.g., bag, box, etc.) at the distal end of the tube 174. Mounting brackets 178 may be used to couple the shields 146 to the mounting plate 172. The plant trimmer 100 may also include a motor 176 that drives the any of the belt 171, the cutting assembly 140, or the rotatable basket 136. Because the cutting assembly 140 and the rotatable basket 136 are linked by the belt 171, driving any of these components with the motor 176 will result in the rotation of both the cutting assembly 140 and the rotatable basket 136.

The plant trimmer 100 may also include a brush 128, for example, as described with respect to FIG. 3. The brush 128 may be configured to push untrimmed leaf material back into the rotatable basket 136. This may clear the rotatable basket 136 of any plant material and help prevent the plant material from gumming up or otherwise occluding the openings 152.

Figure 9A:
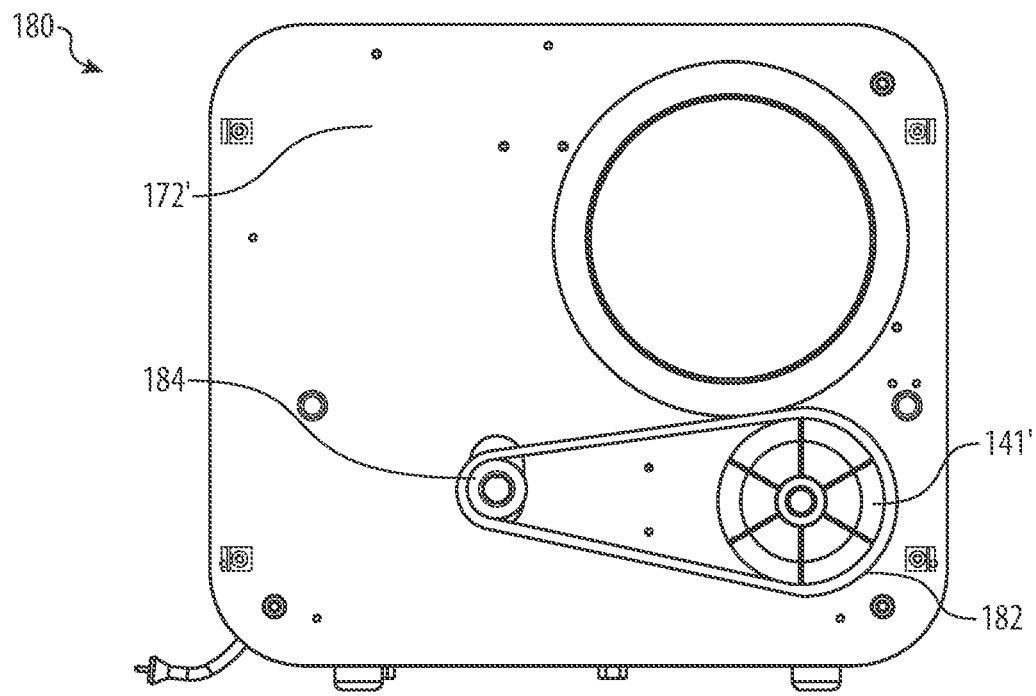
FIG. 9A depicts a motor-reel drive mechanism of the sample plant trimmer of FIG. 1.

FIG. 9A depicts a second side view (opposite the first side view described with respect to FIGS. 8A and 8B) of the plant trimmer 100 of FIG. 1, showing a motor-reel drive mechanism 180. The motor-reel drive mechanism 180 may be used to couple the cutting assembly 140 to the motor 176. In particular, the rotatable cutting mechanism 140 may include a pulley 141' that is positioned on the rotatable cutting mechanism 140 opposite the pulley 141 described with respect to FIGS. 8A and 8B. The motor 176 may also include a pulley 184. The motor-reel drive mechanism 180 may also include a belt 182. The belt 182 may engage the pulleys 141' and 184. The rotatable basket 136 and the cutting assembly 140 may be coupled to or mounted on a mounting plate 172'. The mounting plate 172' may be positioned within the external shell 104 opposite the mounting plate 172. The motor 176 may be used to rotate both the rotatable basket 136 and the cutting assembly 140. For example, rotation of the motor 176 causes the cutting assembly 140 to rotate via the belt 182 and the rotation of the cutting assembly 140 causes the rotatable basket 136 to rotate via the belt 171 (FIGS. 8A-8B).

Figure 9B:
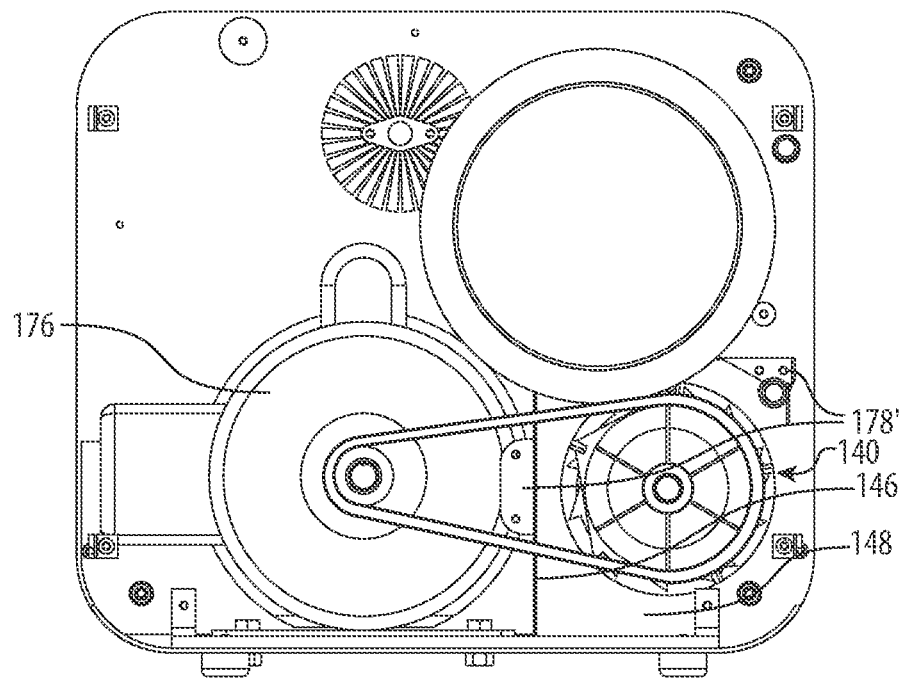
FIG. 9B depicts a motor-reel drive mechanism of the sample plant trimmer of FIG. 1 without a mounting plate.

FIG. 9B depicts the second side view of the plant trimmer 100 shown in FIG. 9A without the mounting plate 172'. As shown, the shields 146 may cooperate to define a cavity 148 surrounding the cutting assembly 140. In this view, the mounting plate 172' is removed to show the mounting brackets 178'. The mounting brackets 178' may be used to fasten the shields 146 around the cutting assembly 140.

Figure 10:
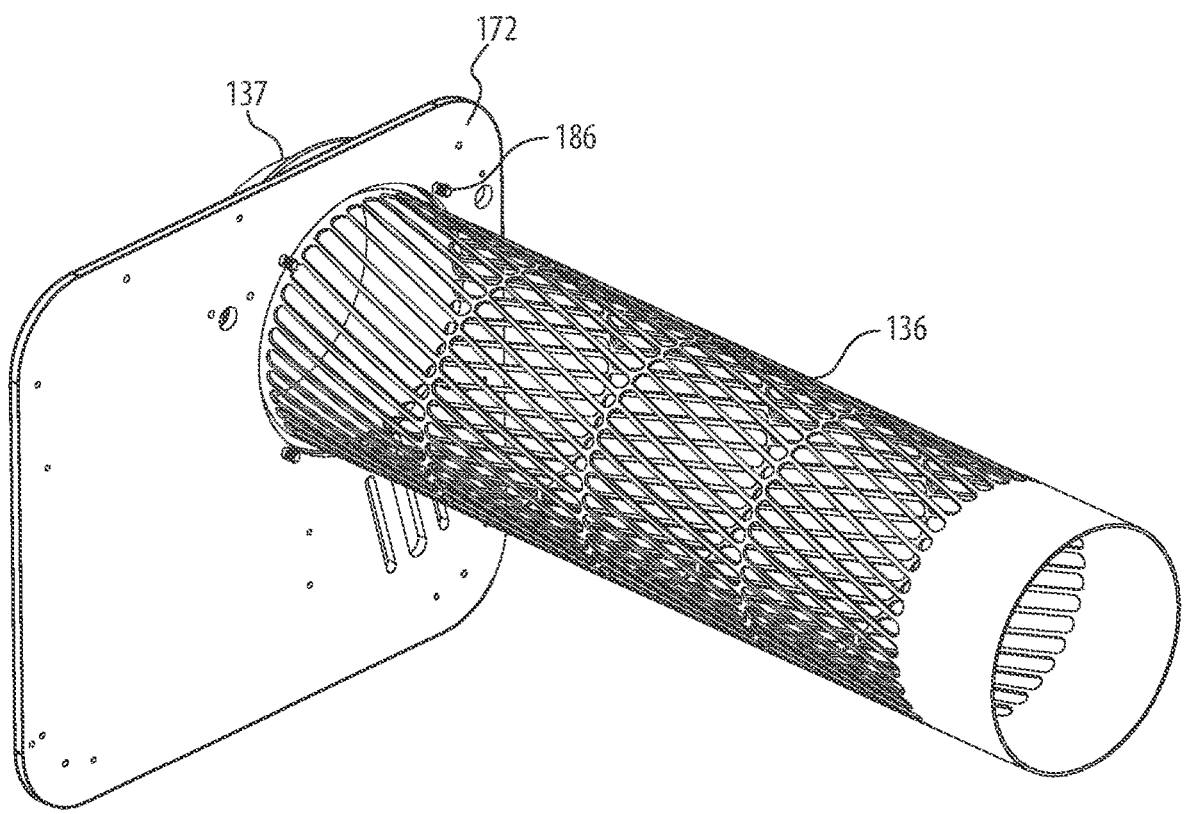
FIG. 10 depicts the rotatable basket of FIG. 4A attached to a frame.

FIG. 10 depicts the rotatable basket 136 coupled to the mounting plate 172. The rotatable basket 136 may be coupled with the mounting plate 172 such that the rotatable basket 136 rotates in place (e.g., the rotatable basket 136 rotates relative to a fixed or stationary mounting plate 172). For example, the rotatable basket 136 and the mounting plate 172 may be coupled via one or more rollers 186. The rollers 186 may be ball bearings having a shaft coupled to the inner portion of the ball bearings. The shaft may be fixed to the mounting plate 172, while a portion of the rotatable basket 136 rotates with respect to the rollers 186. The rollers 186 may be bushings, wheels, or any other suitable components or mechanisms that maintain an alignment and/or position of the rotatable basket 136 while allowing the rotatable basket 136 to rotate.

Figure 11A:
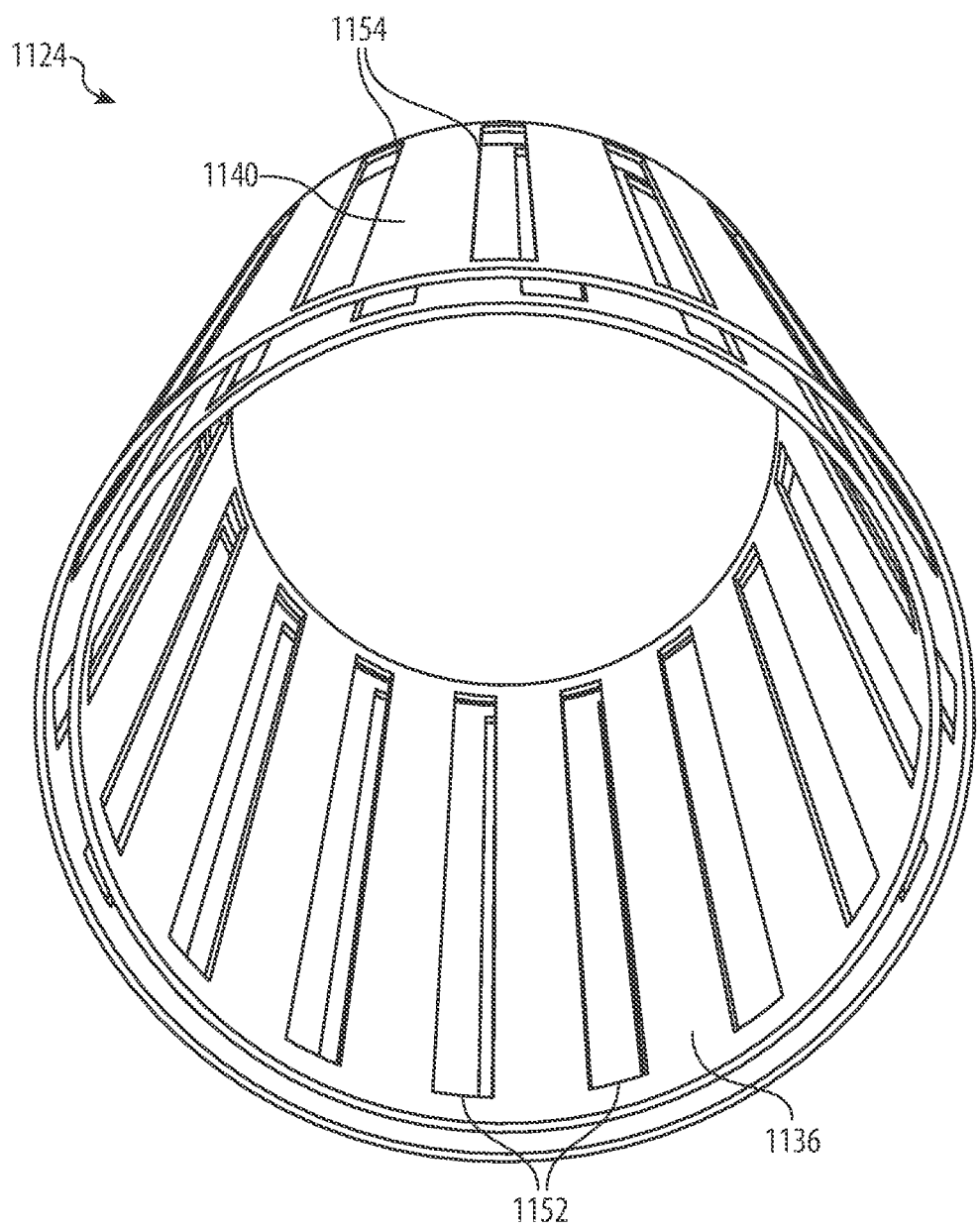
FIG. 11A depicts another embodiment of a cutting mechanism.

FIG. 11A depicts a trimming mechanism 1124. The trimming mechanism 1124 may be substantially analogous in function to the trimming mechanism 124 described with respect to FIG. 3. For example, the trimming mechanism 1124 may be configured to separate plant material between two counter rotating components (or between components rotating in the same direction at different speeds, or one rotating component and one stationary component). In this regard, the trimming assembly 1124 include a rotatable basket 1136 having openings 1152 and a cutting assembly 1140 having blades 1154.

The rotatable basket 1136 may be positioned within the rotating cutting assembly 1140. For example, as depicted in FIG. 11A, the rotatable basket 1136 may be positioned concentrically within the cutting assembly 1140. The rotatable basket 1136 and the cutting assembly 1140 may be configured to counter rotate with respect to one another. In this regard, the rotatable basket 1136 may receive plant material. Rotation of the rotatable basket 1136 may cause the plant material to extend through one or more of the openings 1152. Blades 1154 of the rotating cutting assembly 1140 may engage the plant material that is extending from the openings 1152, and thereby cause the extending plant material to be cut, ripped, or otherwise severed from remaining plant material. As noted, the rotatable basket 1136 and the cutting assembly 1140 may rotate in opposite directions. Alternatively, the rotatable basket 1136 and the cutting assembly 1140 may rotate in the same direction at different speeds, or one of the rotatable basket 1136 and the cutting assembly 1140 may be stationary while the other rotates. Indeed, in this (or other embodiments described herein), cutting may be achieved so long as there is any speed differential between the two components.

The blades 1154 and the ribs defining the openings 1152 may be configured similarly to the rotatable basket 136 and the cutting assembly 140. For example, the blades 1154 and the ribs defining the openings 1152 may define cutting faces having angles as described above with respect to FIG. 7E. Also, the blades 1154 and the ribs defining the openings 1152 may be arranged in a helical or spiral configuration, similar to the arrangement shown and described with respect to FIGS. 6A-6B. For example, the blades 1154 and the ribs defining the openings 1152 may define angles with respect to one another in accordance with the description of FIGS. 6A-6B.

Figure 11B:
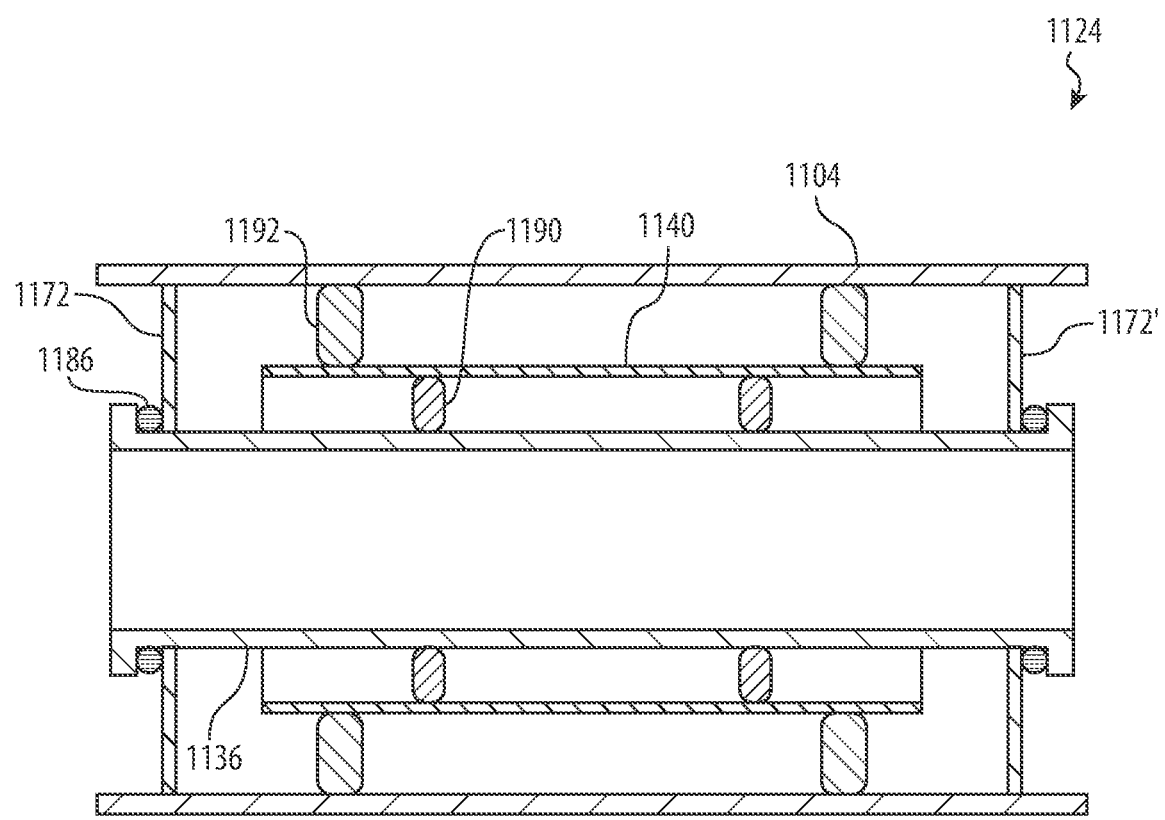
FIG. 11B depicts the cutting mechanism of FIG. 11A coupled with a housing.

FIG. 11B depicts the trimming assembly 1124 described with respect to FIG. 11A coupled with an exemplary housing 1104. As illustrated, the housing 1104 may include mounting plates 1172, 1172' that extend between opposing walls of the housing 1104. The mounting plates 1172, 1172' may include openings at which opposing ends of rotatable basket 1136 may extend through. The rotatable basket 1136 may be coupled to the mounting plates 1172, 1172' via rollers 1186. The rollers 1186 may be fixed to the mountings plates 1172, 1172' while allowing the rotatable basket 1136 to rotate with respect to the rollers 1186. The cutting assembly 1140 may be coupled to the rotatable basket 1136 via internal spacers 1190. The internal spacers 1190 may allow the cutting assembly 1140 to rotate with respect to the rotatable basket 1136. The cutting assembly 1140 may also be coupled to the housing 1104 via external spacers 1192. The external spacers 1192 may allow the cutting assembly 1140 to rotate with respect to the housing 1104. The trimming assembly 1124 shown in FIG. 11B is depicted in schematic form, and does not necessarily represent exact structural components or dimensions.

Figure 11C:
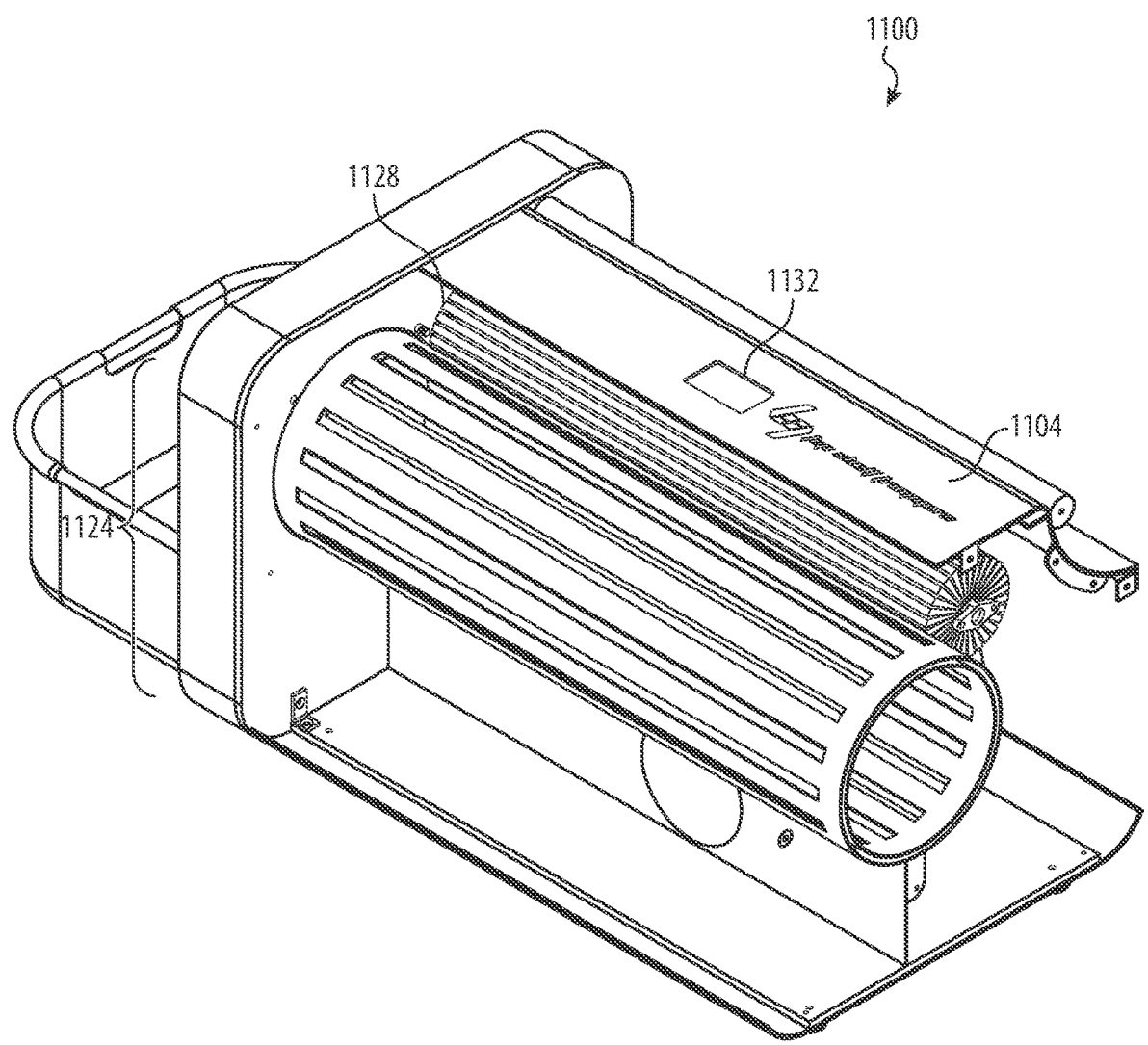
FIG. 11C depicts the cutting mechanism of FIG. 11A arranged within a sample plant trimmer.

FIG. 11C depicts the trimming mechanism 1124 in a plant trimmer 1100. The plant trimmer 1100 may be substantially analogous to the plant trimmer 100 described with respect to FIG. 3. For example, the plat trimmer 1100 may be configured to separate leaves from remaining plant material. In this regard, the plant trimmer 1100 may include an external shell 1104, a brush 1128, and a display 1132, which may have the same configuration and function as the analogous components described with respect to the trimmer 100.

Notwithstanding the foregoing similarities, the plant trimmer 1100 may include the trimming mechanism 1124 described with respect to FIGS. 11A and 11B. As described above, the trimming mechanism 1124 may include the rotatable basket 1136 positioned within the cutting assembly 1140. Counter rotation of (or a speed differential between) the rotatable basket 1136 and the cutting assembly 1140 may cause plant material to be separated within the plant trimmer 1100. The separated plant material may fall to a bottom portion of the external shell 1104. A suction force may be induced within a volume defined by the external shell 1104. This force may move the separated plant material to an outlet of the plant trimmer 1100.

Figure 12A:
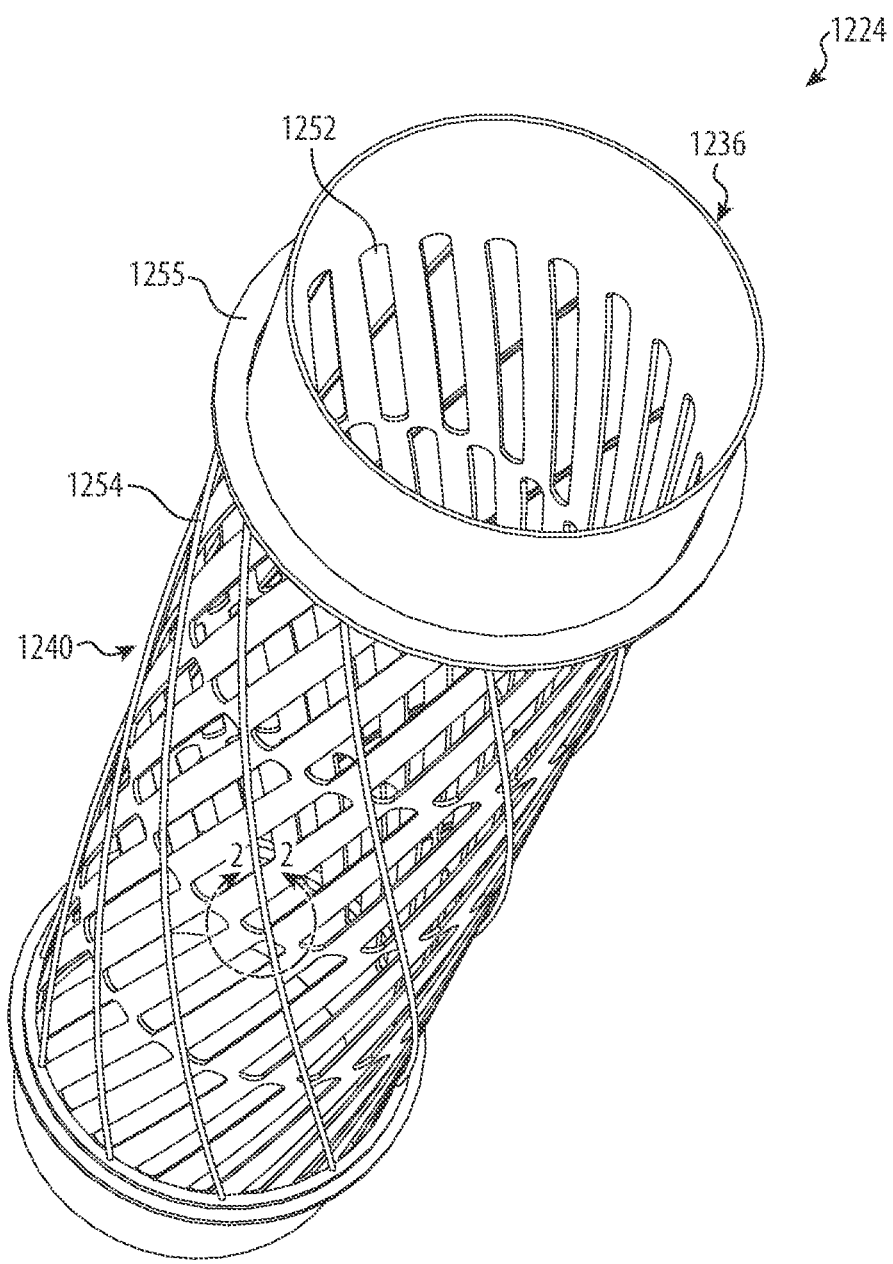
FIG. 12A depicts another embodiment of a cutting mechanism.

FIG. 12A depicts a trimming mechanism 1224. The trimming mechanism 1224 may be substantially analogous to the trimming mechanism 1124 described with respect to FIG. 11A. For example, the trimming mechanism 1224 may be configured to separate plant material between two components positioned concentric with one another. In this regard, the trimming mechanism 1224 may include a rotatable basket 1236 having openings 1252 and a cutting assembly 1240.

Notwithstanding the foregoing similarities, the cutting assembly 1240 includes a one or more wires 1254. The one or more wires 1254 may be an engagement feature that extends between a pair of mounting structures 1255 positioned on opposing ends of the cutting assembly 1240. The rotatable basket 1236 may be positioned within the pair of mounting structures 1255 such that the one or more wires 1254 encompass a portion of the rotatable basket 1236. As shown in FIG. 12A, the one or more wires 1254 may form a helical pattern between the pair of mounting structure 1255. The helical pattern of the one or more wires 1254 may have a handedness that is opposite or distinct from that of the openings 1252 of the rotatable basket 1236. For example, the one or more wires 1254 and the openings 1252 may each spiral in a direction that is different from one another. Alternatively, the helical pattern of the one or more wires 1254 has a same handedness as the helical pattern of the openings 1252, but has a different pitch.

To illustrate, in one embodiment, the rotatable basket 1236 may receive plant material within an interior volume. The rotatable basket 1236 may spin such that the received plant material is pushed toward sidewalls of the rotatable basket 1236 partially through one or more of the openings 1252. In some cases, a suction force may be induced within the rotatable basket 1236 to facilitate movement of the received plant material toward the sidewall of the rotatable basket 1236.

The one or more wires 1254 of the cutting assembly 1240 may engage a portion of the plant material that is extending through the openings 1252 of the rotatable basket 1236. For example, one or more of the one or more wires 1254 may contact the plant material and prevent or resist movement of the plant material relative to the cutting assembly 1240. The one or more wires 1254 may be fixed to the mounting structures 1255 and may be configured to contact the rotatable basket 1236. In some cases, the mounting structures 1255 may be affixed to, or may form a portion of, an inner bulkhead of a plant trimmer, for example, such as mounting plates 172, 172' described with respect to FIGS. 8A-9B. In this regard, the engagement of the plant material by the one or more wires 1254 (and corresponding portion of the rotatable basket 1236) may cause the plant material to tear or shear between the rotatable basket 1236 and the wires of the cutting assembly 1240. For example, the cutting assembly 1240 and the rotatable basket 1236 may each exert opposing forces on the plant material (due to the rotation of the rotatable basket 1236 relative to the cutting assembly 1240) that causes the plant material to be separated or severed.

The one or more wires 1254 may be constructed from a variety of materials as may be appropriate for a given application. In some cases, the one or more wires 1254 may be constructed from nickel, high-carbon steel, a metal alloy, carbon fiber, Kevlar, or any other suitable material. It will be appreciated that each wire of the one or more wires 1254 need not be constructed from the same material. In some cases, a first subset of wires may be a first material and a second subset of wires may be a second, distinct material. Similarly, and for any material, the one or more wires 1254 may have various gauges or sizes depending on a given application, for example, such as a 20 or 22 gauge wire. In some cases, the one or more wires 1254 may have a size that is less than 20 gauge or greater than 22 gauge.

As shown in FIG. 12A, each wire of the one or more wires 1254 may be separated by a space. The space may be within the range of about 1 inch to about 1.5 inches. In some cases, the wires of the one or more wires 1254 may be separated by a space that is less than about 1 inch or greater than about 1.5 inches. The space separating each wire of the one or more wires 1254 may be calibrated for a particular application. For example, the spacing of the one or more wires 1254 may impact the size, consistency, or purity of the trimmed plant material. As one possibility, a large spacing may result in a more coarsely trimmed plant material, while a smaller spacing may result in a finer trimmed plant material.

The one or more wires 1254 may be of a sufficient strength and tension to engage the plant material during rotation of the rotatable basket 1236. For example, the one or more wires 1254 may prevent movement of the plant material such that the plant material is separated between the cutting assembly 1240 and the rotatable basket 1236 during rotation of the rotatable basket 1236. In this regard, the one or more wires 1254 may be selected from one of the foregoing described materials having a high tensile strength, such as a high tensile strength steel or steel alloy. Additionally or alternatively, the one or more wires 1254 may be in a state of tension between the pair of mounting structures 1255. The tension of the one or more wires 1254 may be altered, as may be appropriate, in order to modify a characteristic of the trimmed plant material. For example, a highly tensioned wire may result in a different trimmed plant material than a wire with a relatively lower amount of tension.

Figure 12B:
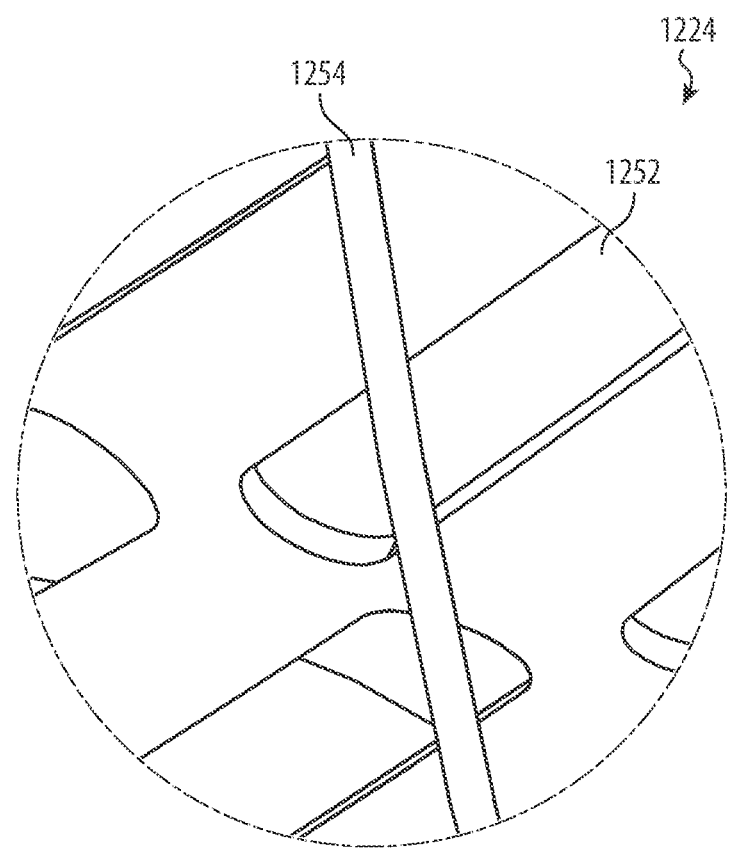
FIG. 12B depicts an enlarged view of the cutting mechanism of FIG. 12A, taken at detail 2-2 of FIG. 12A.

FIG. 12B depicts detail 2-2 of FIG. 12A of the trimming mechanism 1224. As shown in the non-limiting example of FIG. 12B, the one or more wires 1254 and the openings 1252 overlap during rotation of the rotatable basket 1236. For example, one of the one or more wires 1254 may extend across a corresponding one of the openings 1252. Because the one or more wires 1254 spiral in a direction distinct from the openings 1252, the depicted wire extends transverse to a longitudinal axis of a given opening 1252 during rotation of the rotatable basket 1236. This allows the one or more wires 1254 to engage plant material extending through the openings 1252 and contribute to tearing or shearing the plant material as the rotatable basket 1236 continues to rotate relative to the cutting assembly 1240.

Figure 12C:
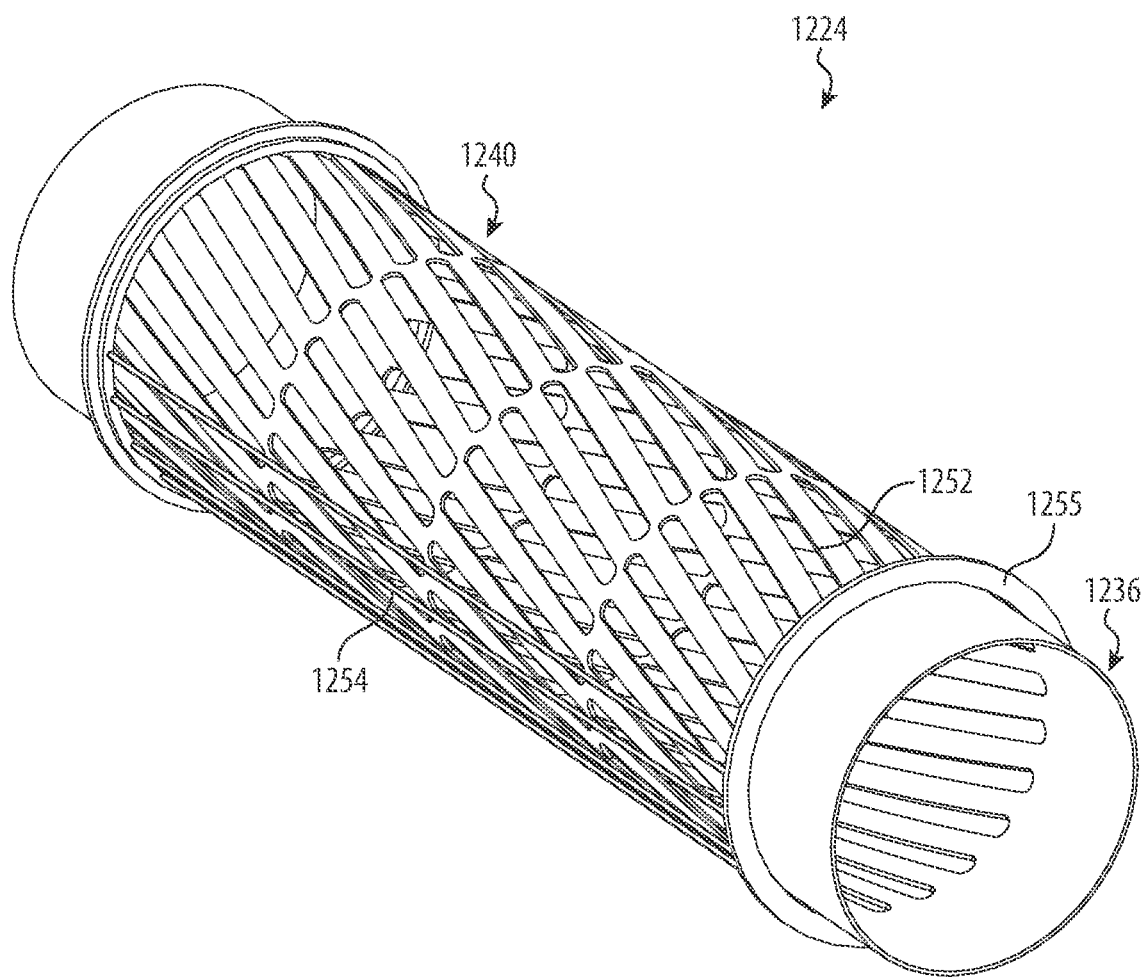
FIG. 12C depicts another embodiment of a cutting mechanism.

FIG. 12C depicts the trimming mechanism 1224 described above with respect to FIGS. 12A and 12B, according to another embodiment. In particular, FIG. 12C depicts the one or more wires 1254 extending in a substantially straight or linear path between the pair of mounting structures 1255. In this regard, the one or more wires 1254 depicted in FIG. 12C may have different properties than the one or more wires 1254 depicted with respect to FIGS. 12A and 12B, which may be beneficial for producing trimmed plant material having various characteristics. For example, the one or more wires 1254 depicted in FIG. 12A may be in a state of tension that is distinct from a state of tension of the wires 1254 depicted with respect to FIGS. 12A and 12B. Additionally, FIG. 12C depicts the one or more wires 1254 positioned at a localized region of the pair of mounting structure 1255. The localized region of the pair of mounting structure 1255 may be associated with a suction region or other portion of a plant trimmer through which the sheared plant material moves toward subsequent to the shearing (e.g., to remove excess or waste material). In this way, the wires can be located primarily adjacent a region where the plant material is likely to be during rotation of the rotatable basket 1236. (E.g., the plant material is unlikely to be along a top half of the rotatable basket 1236 in a horizontally oriented trimmer, and as such the wires may be omitted from along the top surface.)

Figure 12D:
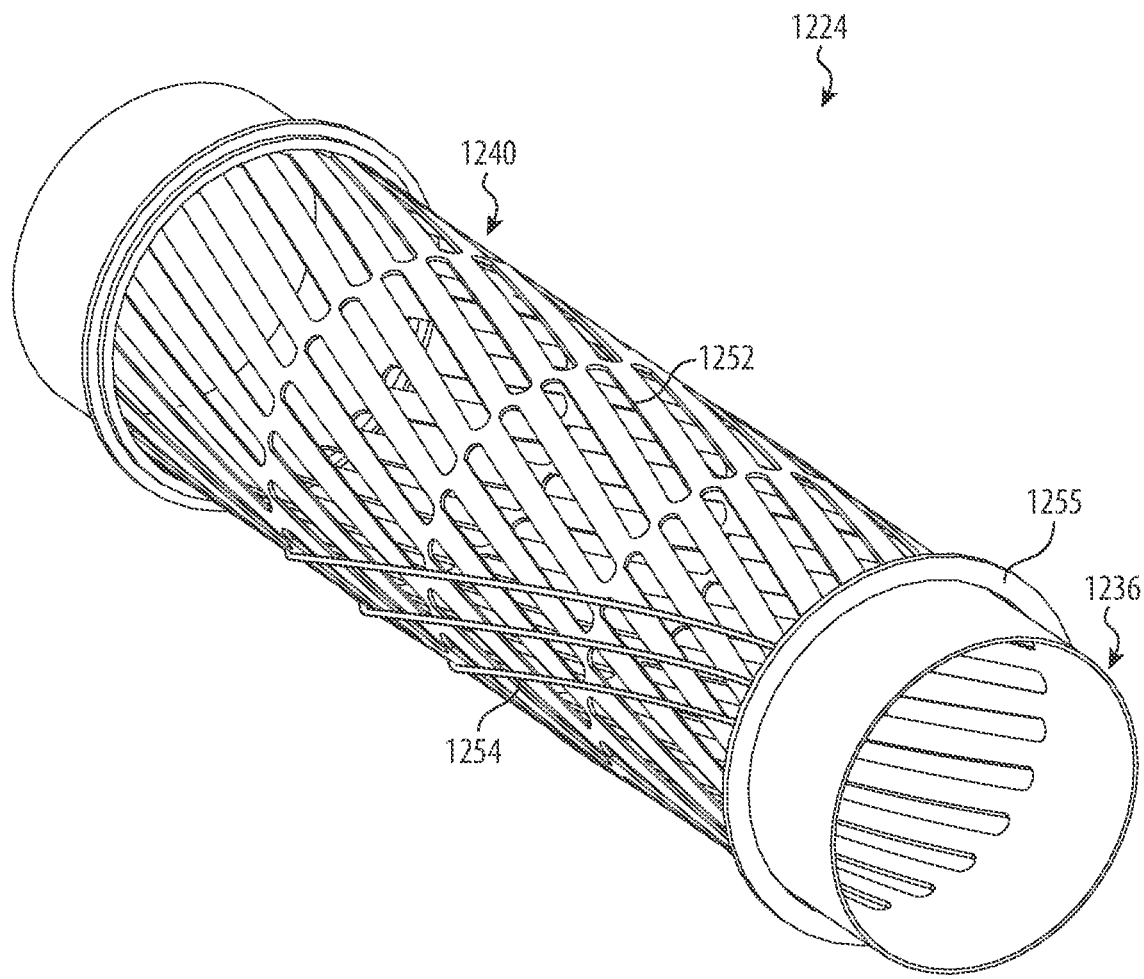
FIG. 12D depicts another embodiment of a cutting mechanism.

FIG. 12D depicts the trimming mechanism 1224 described above with respect to FIGS. 12A and 12B, according to another embodiment. In particular, FIG. 12D depicts the one or more wires 1254 having a reduced spacing separating individual wires. Additionally, FIG. 12D depicts the one or more wires 1254 positioned at a localized region of the pair of mounting structure 1255. The localized region of the pair of mounting structure 1255 may be associated with a suction region or other portion of a plant trimmer through which the sheared plant material moves toward subsequent to the shearing (e.g., to remove excess or waste material).

Figure 12E:
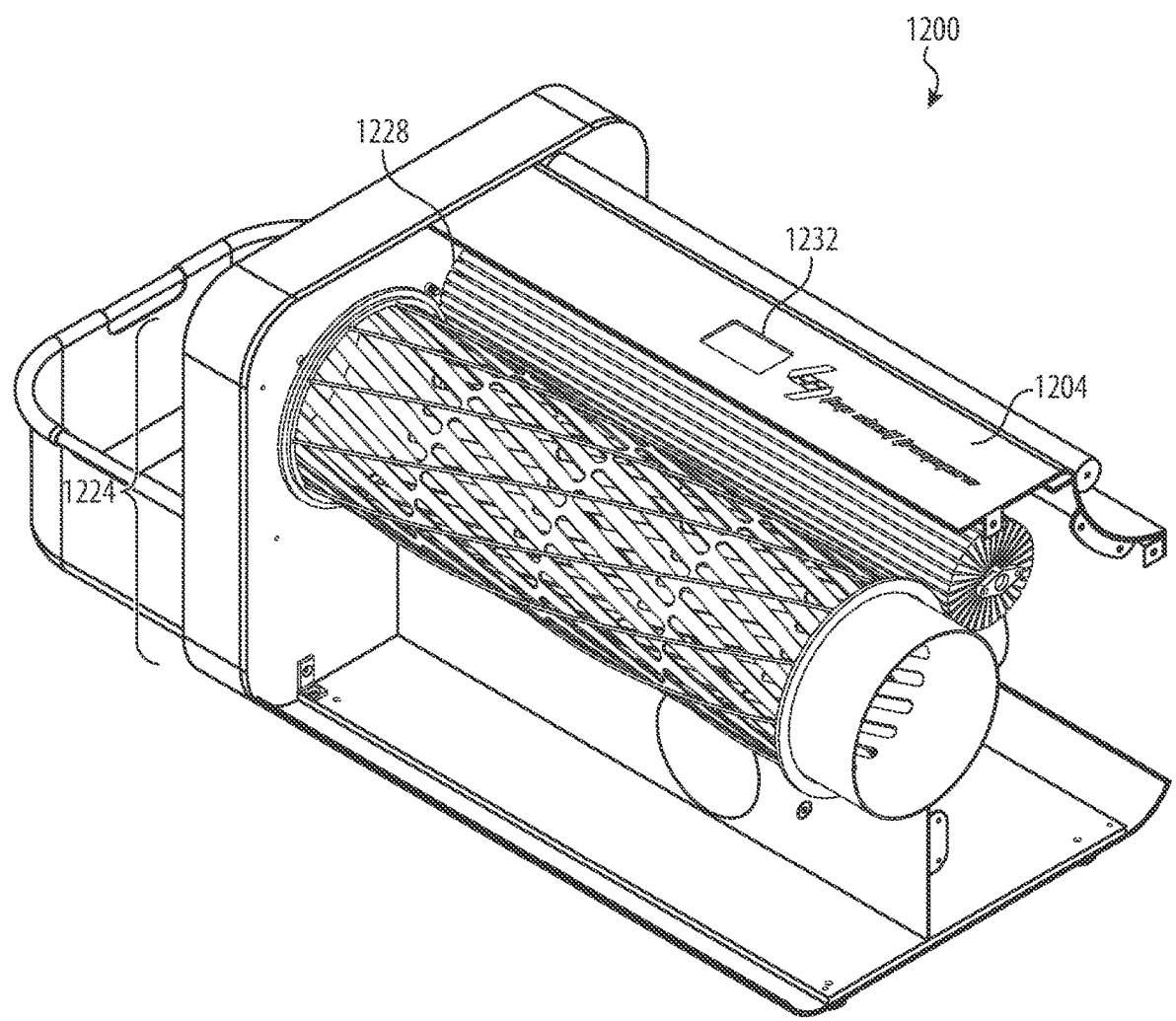
FIG. 12E depicts the cutting mechanism of FIG. 12A arranged within a sample plant trimmer.

FIG. 12E depicts the trimming mechanism 1224 described with respect to FIGS. 12A and 12B positioned within a plant trimmer 1200. The plant trimmer 1200 may be substantially analogous to the plant trimmer 100 described with respect to FIG. 3. For example, the plant trimmer 1200 may be configured to separate leaves from plant material. In this regard, the plant trimmer 1200 may include an external shell 1204, a brush 1228, and a display 1232, which may have the same configuration and function as the analogous components described with respect to the trimmer 100.

Notwithstanding the foregoing similarities, the plant trimmer 1200 may include the cutting mechanism 1240 described with respect to FIGS. 12A and 12B. As described above, the trimming mechanism 1224 may include the rotatable basket 1236 positioned within the cutting assembly 1240. Rotation of the rotatable basket 1236 and engagement by the cutting assembly 1240 may cause plant material to separate within the plan trimmer 1200. The separated plant material may fall to a bottom portion of the external shell 1204. A suction force may be induced within a volume defined by the external shell 1204. This force may move the separated plant material to an outlet of the plant trimmer 1200.

Figure 13:
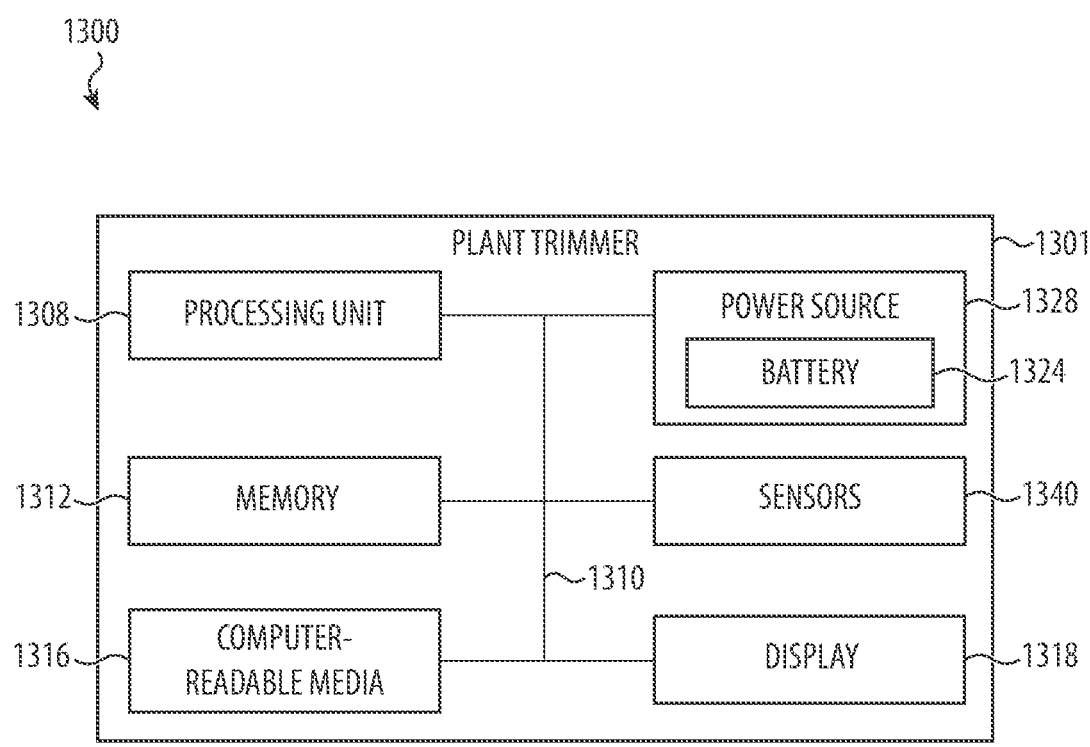
FIG. 13 illustrates a functional block diagram of a plant trimmer.

FIG. 13 presents a functional block diagram 1300 of a plant trimmer 1301, which may correspond to the plant trimmer 100 and/or the plant trimmers 1100, 1200 described with respect to FIGS. 1-12E. The plant trimmer 1301 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 13, the plant trimmer 1301 may include a processing unit 1308 operatively connected to computer memory 1312 and computer-readable media 1316. The processing unit 1308 may be operatively connected to the memory 1312 and computer-readable media 1316 components via an electronic bus or bridge (e.g., such as system bus 1310). The processing unit 1308 may include one or more computer processors or microcontrollers that are configured to perform operations in response to computer-readable instructions. The processing unit 1308 may include the central processing unit (CPU) of the device. Additionally or alternatively, the processing unit 1308 may include other processors within the device including application specific integrated chips (ASIC) and other microcontroller devices.

The memory 1312 may include a variety of types of non-transitory computer-readable storage media, including, for example, read access memory (RAM), read-only memory (ROM), erasable programmable memory (e.g., EPROM and EEPROM), or flash memory. The memory 1312 is configured to store computer-readable instructions, sensor values, and other persistent software elements. Computer-readable media 1316 may also include a variety of types of non-transitory computer-readable storage media including, for example, a hard-drive storage device, a solid state storage device, a portable magnetic storage device, or other similar device. The computer-readable media 1316 may also be configured to store computer-readable instructions, sensor values, and other persistent software elements.

In this example, the processing unit 1308 is operable to read computer-readable instructions stored on the memory 1312 and/or computer-readable media 1316. The computer-readable instructions may adapt the processing unit 1308 to perform the operations or functions described above with respect to FIGS. 1-12E. The computer-readable instructions may be provided as a computer-program product, software application, or the like.

The plant trimmer 1301 may also include a display 1318 (e.g., corresponding to the displays 132, 1132, 1232 described above). The display 1318 may include a liquid-crystal display (LCD), organic light emitting diode (OLED) display, light emitting diode (LED) display, or the like. If the display 1318 is an LCD, the display may also include a backlight component that can be controlled to provide variable levels of display brightness. If the display 1318 is an OLED or LED type display, the brightness of the display 1318 may be controlled by modifying the electrical signals that are provided to display elements. The display may indicate various properties corresponding to plant trimming. In one implementation, the display may illuminate indicia corresponding to the rotational speed of the rotatable basket and/or cutting assembly, a detected resin volume, a process run time, and/or any other appropriate parameters. As such, the indicia of the display may be selectively modifiable based on the particular arrangement of sensors including in the plant trimmer and may be customized or otherwise tailored to suit user preferences.

The plant trimmer 1301 may also include a battery 1324 that is configured to provide electrical power to the components of the plant trimmer 1301. The battery 1324 may include one or more power storage cells that are linked together to provide an internal supply of electrical power. In this regard, the battery 1324 may be a component of a power source 1328 (e.g., including a charging system or other circuitry that supplies electrical power to components of the plant trimmer 1301). The battery 1324 may be operatively coupled to power management circuitry that is configured to provide appropriate voltage and power levels for individual components or groups of components within the plant trimmer 1301. The battery 1324, via power management circuitry, may be configured to receive power from an external source, such as an AC power outlet. The battery 1324 may store received power so that the plant trimmer 1301 may operate without connection to an external power source for an extended period of time, which may range from several hours to several days.

The plant trimmer 1301 may also include one or more sensors 1340 that may be used to detect a touch and/or force input, environmental condition, orientation, position, or some other aspect of the plant trimmer 1301. Example sensors 1340 that may be included in the plant trimmer 1301 may include, without limitation, one or more accelerometers, gyrometers, inclinometers, goniometers, or magnetometers. The sensors 1340 may also include one or more proximity sensors, such as a magnetic hall-effect sensor, inductive sensor, capacitive sensor, continuity sensor, or the like.

The sensors 1340 may be configured to detect characteristics of the plant trimming performed by the plant trimmer 1301, for example, to optimize or improve a desired cutting result. Accordingly, the sensors 1340 may include a temperature sensor, barometer, pressure sensor, altimeter, moisture sensor or other similar environmental sensor. The sensors 1340 may also include a light sensor that detects an ambient light condition of the plant trimmer 1301. In other embodiments, the sensors 1340 may include a resin sensor that is configured to detect a volume of resin contained within one or both of the rotatable basket and/or the cutting assembly desired herein. Additionally or alternatively, the sensors 1340 may include a motion or vibration sensor that is configured to detect movements of the rotatable basket and/or cutting assembly. The foregoing sensors may allow process parameters of the plant trimmer 1301 to be dynamically adjusted during operation, which may help produce a cutting result customized to user preferences.

In this regard, in a particular embodiment, the sensors 1340, either alone or in combination, may generally be a motion sensor that is configured to determine an orientation, position, and/or movement of the plant trimmer 1301. For example, the sensor 1340 may include one or more motion sensors including, for example, one or more accelerometers, gyrometers, magnetometers, optical sensors, or the like to detect motion. The sensors 1340 may also be configured to determine one or more environmental conditions, such as temperature, air pressure, humidity, and so on. The sensors 1340, either alone or in combination with other input, may be configured to estimate a property of a supporting surface including, without limitation, a material property, surface property, friction property, or the like.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A plant trimmer, comprising:
   a case;
   a pair of carriages configures to counter rotate with respect to each other, a first carriage of the pair of carriages having a slotted shell and a second carriage of the pair of carriages positioned lower than the first carriage and having a pattern of helical blade;
   a space separating the pair of carriages and extending along a longitudinal direction parallel with an axis of rotation of each of the pair of carriages, wherein;
   the pair of carriages is configured to sever plant matter extending across the space by exerting opposing forces on a sample;
   a sensing element positioned within the case and configured to measure a characteristic of the pair of carriages;
   a processing unit coupled with the sensing element and configured to cause the pair of carriages to rotate according to a parameter based on the measured characteristic, wherein:

the characteristic corresponds to a volume of a resin contained within one or both of the pair of carriages, the resin being expelled from the plant matter during counter rotation of the pair of carriages;

the processing unit is further configured to alter a rotational speed of one or both of the pair of carriages when the volume of the resin exceeds a threshold value;

wherein the pair of carriages is configured to sever the plant matter free from contact with a non-rotating blade; and wherein the plant trimmer does not include a bed knife.

\* \* \* \* \*